(12) United States Patent
Zhang

(10) Patent No.: US 12,435,799 B2
(45) Date of Patent: Oct. 7, 2025

(54) DIFFERENTIAL PRESSURE DRIVEN DIAPHRAGM VALVE WITH SEPARATED DRIVE CHAMBER AND VALVE ACTUATION CHAMBER, AND ASSEMBLING METHOD THEREOF

(71) Applicant: KOSCN Industrial Manufacturing (Shenzhen) Co., Ltd., Guangdong (CN)

(72) Inventor: Shengzhou Zhang, Guangdong (CN)

(73) Assignee: KOSCN Industrial Manufacturing (Shenzhen) Co., Ltd., Guangdong (CN)

( * ) Notice: Subject to any disclaimer, the term of this patent is extended or adjusted under 35 U.S.C. 154(b) by 125 days.

(21) Appl. No.: 18/592,688

(22) Filed: Mar. 1, 2024

(65) Prior Publication Data

US 2024/0295270 A1   Sep. 5, 2024

(30) Foreign Application Priority Data

Mar. 3, 2023 (CN) .......................... 202310248866.3

(51) Int. Cl.
*F16K 7/17* (2006.01)
*F16K 7/12* (2006.01)
*F16K 31/122* (2006.01)

(52) U.S. Cl.
CPC .................. *F16K 7/17* (2013.01); *F16K 7/12* (2013.01); *F16K 31/1221* (2013.01)

(58) Field of Classification Search
CPC ........... F16K 7/17; F16K 7/12; F16K 31/1221
See application file for complete search history.

(56) References Cited

U.S. PATENT DOCUMENTS 6,007,045 A * 12/1999 Heiniger .................... F16K 7/16
  251/63.5
6,820,855 B1 * 11/2004 Heller ........................ F16K 7/12
  137/485

(Continued)

FOREIGN PATENT DOCUMENTS

CN     201696657 U     1/2011
CN     102705530 A    10/2012

(Continued)

OTHER PUBLICATIONS

First Office Action received in corresponding Chinese patent application No. 202310248866.3, dated Dec. 23, 2024, 24 pages.

*Primary Examiner* — Umashankar Venkatesan
(74) *Attorney, Agent, or Firm* — Cooper Legal Group, LLC

(57) ABSTRACT

A differential pressure driven diaphragm valve with a separated drive chamber and a valve actuation chamber and an assembling method thereof. The valve includes a piston assembly, a drive chamber cylinder body for driving the piston assembly, and a valve actuation chamber valve body for changing a diaphragm piece shape with a diaphragm press block to close a flow passage. A drive rod of the piston assembly is connected to a central connecting portion of the diaphragm by a shaft coupler which is detachably positioned in the diaphragm press block. The central connecting portion of the diaphragm piece establishes a non-rotatable and relatively liftable limiting with the valve body by the valve body and the diaphragm press block. The periphery of the diaphragm piece forms a non-rotatable connection with the valve body. The diaphragm piece forms a relatively rotatable connection with the drive rod by the shaft coupler.

16 Claims, 17 Drawing Sheets

(56) References Cited

U.S. PATENT DOCUMENTS

| | | | | |
|---|---|---|---|---|
| 7,066,202 B2* | 6/2006 | Fukano | ............... | F16K 7/14 |
| | | | | 137/553 |
| 7,389,969 B2* | 6/2008 | Masamura | ............... | F16K 7/14 |
| | | | | 251/63.5 |
| 7,628,376 B2* | 12/2009 | Masamura | ............... | F16K 7/14 |
| | | | | 251/63.6 |
| 8,087,641 B2* | 1/2012 | Masamura | ............... | F16K 31/122 |
| | | | | 251/367 |
| 8,322,364 B2* | 12/2012 | Lacasse | ............... | F16K 27/0281 |
| | | | | 137/271 |
| 9,638,345 B2* | 5/2017 | Okita | ............... | F16K 7/14 |
| 2015/0053874 A1* | 2/2015 | Kai | ............... | F16K 31/122 |
| | | | | 251/61.1 |
| 2019/0301637 A1* | 10/2019 | Volpp | ............... | F16K 7/126 |
| 2019/0338862 A1* | 11/2019 | Duffin | ............... | F16K 31/1266 |

FOREIGN PATENT DOCUMENTS

| | | |
|---|---|---|
| CN | 103542130 A | 1/2014 |
| CN | 212203220 U | 12/2020 |
| CN | 114396487 A | 4/2022 |

* cited by examiner (A)

(B)

(C)

(A)

(B)

(A)

(B)

DIFFERENTIAL PRESSURE DRIVEN DIAPHRAGM VALVE WITH SEPARATED DRIVE CHAMBER AND VALVE ACTUATION CHAMBER, AND ASSEMBLING METHOD THEREOF

CROSS-REFERENCE TO RELATED APPLICATION

This application claims a priority and benefit of China patent application serial no. 202310248866.3, filed on Mar. 3, 2023. The entirety of China patent application serial no. 202310248866.3 is hereby incorporated by reference herein and made a part of this specification.

TECHNICAL FIELD

The present invention relates to the technical field of diaphragm valves, and more particularly, to a differential pressure driven diaphragm valve with a separated drive chamber and a valve actuation chamber and an easy-to-assemble and quick-to-disassemble assembling method thereof. A specific application thereof is a dedicated valve for semiconductor production equipment.

BACKGROUND ART

Existing differential pressure driven diaphragm valves are suitable for larger-flow diaphragm valves where the fluid in the drive chamber of the diaphragm valve is typically air. In particular, it is a pneumatic diaphragm valve. The valve actuation chamber of the diaphragm valve is required to open and close a large flow of working fluid, in particular cleaning water or a chemical agent. It is common to design the drive chamber separately from the valve actuation chamber to avoid contamination or interaction of the different fluids of the two chambers. Taking the pneumatic diaphragm valve as an example, it is a mechanical structure of a direct-stroke switch, which can perform faster opening and closing drive, and is suitable for an automatic control valve for the application of fluid containing particles, and the control of cleaning water or etching chemicals with particles applied to the surface treatment equipment such as semiconductor, solar energy and electroplating. The pneumatic diaphragm valve is also a kind of valve with a smaller dead zone of an inner cavity flow passage, and is more used in the occasions where water quality is required, such as an electronic ultrapure water pipeline system. The pneumatic diaphragm valve is also a valve having excellent sealing performance, which is an indispensable production component for the system application which easily produces hazardous chemicals or gases.

In the operation of faster opening and closing driving of the differential pressure driven diaphragm valve, a piston partition plate of a piston assembly in the drive chamber in the structure is usually subjected to extremely rapid lifting and lowering pressure difference changes many times, and is prone to have an eccentric stress. When the central point of a diaphragm piece generates an inclined stress inclined to the axial direction due to the transmission thereof to the diaphragm piece, the central point of the diaphragm piece cannot be lifted and lowered smoothly in the valve actuation chamber, the central point of the diaphragm piece is pulled obliquely, and a flexible diaphragm deformation part of the diaphragm piece is subjected to an uneven pulling stress, which affects the valve sealing effect of the diaphragm piece. It has been proposed that a spring is sleeved on a drive rod in the drive chamber, so as to reduce or share the surge effect of the inclined stress with an elastic force. However, in use, it is found that the torsional stress of the drive rod increases, and the flexible diaphragm deformation part of the diaphragm piece will bear the torsional stress, thus shortening the service life of the diaphragm piece.

Patent Publication No. CN102705530A discloses a diaphragm-type pneumatic diaphragm valve, including a valve body, a lower cover and an upper cover equivalent to a drive chamber cylinder body. The lower cover is mounted on the top of the valve body. The upper cover is mounted on the top of the lower cover. A valve rod (equivalent to a drive rod) is mounted in the valve body. A valve core is connected to the bottom end of the valve rod, and the valve core is connected to a diaphragm piece. A diaphragm piece of an air diaphragm actuator is disposed between the lower cover and the upper cover (i.e., replacing a conventional piston plate with a pneumatic diaphragm piece). The diaphragm piece of the air diaphragm actuator encloses a lower sealing space with the lower cover, and the diaphragm piece of the air diaphragm actuator encloses an upper sealing space with the upper cover. An air inlet hole is disposed on the lower cover, and an air outlet hole is disposed on the upper cover (equivalent to air pressure difference driving). The top end of the valve rod extends upwards through the diaphragm piece of the air diaphragm actuator to the upper sealing space. The diaphragm piece of the air diaphragm actuator can drive the valve rod to move up and down to open or close the valve. A spring in a compressed state is mounted between the diaphragm piece of the air diaphragm actuator and the top wall of the upper cover. However, in the relevant prior art, the form in which a spring is sleeved over a pointer connected above a valve rod and an elastic component is sleeved on the axis does not depart from the inherent thinking in the art. The diaphragm press cover for sandwiching the diaphragm piece of the air diaphragm actuator creates a new technical problem. Although the diaphragm press cover avoids the air leakage caused by the friction of the cylinder wall from the side, the diaphragm piece of the air diaphragm actuator is directly subjected to the moment differential pressure of the air pressure at the exposed part outside the diaphragm press cover, and the diaphragm piece of the air diaphragm actuator is easily aged and broken. Furthermore, the amount of deformation of the diaphragm piece of the air diaphragm actuator at the exposed peripheral site also relatively reduces the driving force for the lifting and lowering of the valve rod, resulting in the need for greater elasticity of the spring. The increased elasticity of the spring facilitates both torsional stress of the valve rod and assembly of the diaphragm valve.

Utility Model No. CN201696657U discloses a pneumatic diaphragm valve, including: a cylindrical valve body, wherein a valve rod capable of moving up and down is disposed in the valve body; the upper end of the valve rod is connected to a drive device, and the lower end is connected to a valve core (equivalent to a diaphragm press block) disposed in the inner cavity of the valve body; a membrane piece (equivalent to a diaphragm piece) is disposed between the valve core and a medium delivery chamber (equivalent to a valve actuation chamber) of the valve; and the valve core and the center of the membrane piece are fastened together, wherein a teflon material layer is adhered on the surface of the membrane piece facing the delivery cavity. It mainly improves the problem of poor corrosion resistance of the diaphragm by using the material of the membrane piece. In the relevant prior art, a spring (equivalent to an elastic body) is connected to the bottom of the cylinder cover and a piston (equivalent to a piston plate). The spring is also axially sleeved on the valve rod. The valve core is only used for pressing and contacting a soft diaphragm flexion of the diaphragm piece when the center of the diaphragm piece descends to achieve the closing of the valve. The twisting of the valve core drives the twisting of the soft diaphragm flexion of the diaphragm piece to shorten the service life of the diaphragm piece.

Patent Publication No. CN103542130A discloses a biological antibacterial pneumatic diaphragm valve, including a valve body, a valve rod (equivalent to a drive rod), a valve cover, a diaphragm assembly (equivalent to a combination of a diaphragm piece and a diaphragm press block) and a pneumatic assembly (equivalent to a piston assembly), wherein the valve cover is disposed on the valve body; the pneumatic assembly is disposed on the valve cover; one end of the valve rod is connected to the pneumatic assembly, and the other end is connected to the diaphragm assembly; the diaphragm assembly is movably disposed in the valve cover for isolating a medium flow channel of the valve body from the pneumatic assembly and the valve rod; and when the valve is closed, the diaphragm assembly closes the medium flow channel of the valve body when driven by the valve rod. The disclosed patent is a common pneumatic diaphragm valve in the prior art. The diaphragm assembly includes a valve flap (equivalent to a diaphragm press block), and a diaphragm and a diaphragm pad (the combination of the two is equivalent to the diaphragm piece). The valve flap is fixed on the valve rod via a connecting cylinder and a pin. A diaphragm is provided between the valve flap and the diaphragm pad and is fixed to the connecting cylinder by means of a screw, thereby achieving the connection of the diaphragm to the valve flap. The diaphragm pad is made from PTFE and the diaphragm is made from EPDM to enhance the sealing effect of the diaphragm pad. In the related art, there is generally no change in the structure of the diaphragm piece, particularly thickening or increasing the number of lamination layers, because the soft diaphragm flexion that affects the diaphragm piece does not achieve the desired effective deformation. Therefore, when the thickness of the soft diaphragm flexion becomes thicker, the capacity of bearing torsional stress is higher and it is not easy to be aged, but it is not conducive to effective deformation under the press contact of the diaphragm press block. When the soft diaphragm flexion of the diaphragm piece thickens to affect its deformation capacity, the diaphragm piece cannot well close the medium flow channel of the valve body, and also cannot well open the medium flow channel. When the thickness of the soft diaphragm flexion is thinner as in the conventional design, the soft diaphragm flexion can be easily deformed by the press contact of the diaphragm press block, so as to close the medium flow channel of the valve body. However, it is easily subjected to torsional stress and aging, and the diaphragm piece is easily damaged under the operation of multiple switching.

SUMMARY

The main object I of the present invention is to provide a differential pressure driven diaphragm valve with a separated drive chamber and a valve actuation chamber. The primary advance is to solve the technical problems of poor valve sealing effect of a diaphragm piece due to eccentric stress of a piston plate acting on a drive rod under the differential pressure from switching and deterioration of durability of the diaphragm piece due to elastic torsion of an axial rotation of a drive rod driven by an elastic component or free rotation of the center of the diaphragm piece.

The main object II of the present invention is to provide an assembling method for a differential pressure driven diaphragm valve with a separated drive chamber and a valve actuation chamber, so as to achieve the manufacture of the differential pressure driven diaphragm valve capable of solving the aforementioned problems, and to have the effect of being easy-to-assemble and quick-to-disassemble.

The main object I of the present invention is achieved by the following technical solutions.

A differential pressure driven diaphragm valve with a separated drive chamber and a valve actuation chamber is provided includes:

a piston assembly including an axially movable drive rod and a piston plate fixed on the drive rod, wherein an upper surface of the piston plate is provided with a groove for a plurality of eccentrically arranged elastic bodies to abut against;

a cylinder body constituting a differential pressure driven chamber and including a cylinder base and a cylinder cover, which are fixedly connected to each other in a threadedly snap connection manner, wherein the piston plate is subjected to an upper and lower differential pressure, which causes lifting and lowering in the differential pressure driven chamber and synchronously drives the lifting and lowering of the drive rod; a plurality of eccentrically arranged elastic bodies are disposed in the cylinder cover; the piston plate is positioned in the differential pressure driven chamber; the elastic bodies have a preset elastic stroke, so that the elastic bodies do not provide an elastic force when the cylinder cover is screwed with the cylinder base; and one end of the drive rod is positioned in a central hole of the cylinder cover, and the other end of the drive rod is used for passing through the cylinder base and the valve cover;

a valve body constituting a valve actuation chamber and including a valve base and a valve cover which are combined with each other, wherein the cylinder base is fixedly connected to the valve cover by indirect screw connection near a shaft center and radial convex-convex limit at a periphery of the shaft;

a diaphragm piece positioned in the valve actuation chamber for blocking a first flow passage and a second flow passage in the valve base, wherein a non-rotatable connection relationship is formed between the periphery of the diaphragm piece and the valve cover and/or the valve base;

a diaphragm press block positioned in the valve actuation chamber for pushing the diaphragm piece to block; and a shaft coupler which connects the other end of the drive rod and a central connecting portion of the diaphragm piece so that a non-rotatable connection relationship is formed between the center of the diaphragm piece and the shaft coupler, wherein the shaft coupler is detachably positioned inside the diaphragm press block and positioned on the diaphragm piece, so that a relatively rotatable connection relationship is formed between the shaft coupler and the drive rod, and a non-rotatable connection relationship is formed between the shaft coupler and the diaphragm press block; wherein the diaphragm pressure block has a plurality of peripheral teeth, and the valve cover has a plurality of longitudinal guide grooves for guiding the sliding of the peripheral teeth, so that a non-rotatable and relatively liftable limiting relationship is formed between the diaphragm pressure block and the valve cover.

In the present embodiment, the combination of the relationship among the shaft coupler, the diaphragm press block and the peripheral teeth thereof and the longitudinal guide groove of the valve cover establishes that, in the valve actuation chamber, the center of the diaphragm does not rotate synchronously with the periphery, and the center of the diaphragm does not receive the torsional stress from the drive rod and does not freely twist. The soft diaphragm flexion of the diaphragm piece does not receive the torsional stress of the central connecting portion with respect to the peripheral site, resulting in the uncontrollable service life of the diaphragm being shortened. In addition, the drive rod only needs to drive the lifting and lowering of the axial center of the central connecting portion of the diaphragm piece. A rotation force blocking effect of the drive rod on the inner component of the valve actuation chamber is formed between the differential pressure driven chamber and the valve actuation chamber at the driving axial center. During the driving process of the valve switching, the drive rod may be lifted and lowered axially in a better and smoother way and rotate freely, without being constrained by the movement of the inner component of the valve actuation chamber. The accuracy requirement of the drive rod may be more loose than the previous requirements. Furthermore, by using several eccentrically arranged elastic bodies disposed at a fixed point in the cylinder cover, the inherent thinking that the existing spring is sleeved on the drive rod is broken, and the elastic bodies do not directly contact the drive rod. The drive rod is jointly provided with an axial pressing elastic force of which the resultant force is not eccentric by the piston plate, thereby providing easy disassembling and repairing. The elastic bodies have a preset elastic stroke, so that the elastic bodies do not provide an elastic force when the cylinder cover is screwed with the cylinder base. It also becomes light in assembly. In addition, the plurality of eccentrically arranged elastic bodies will also have a longer service life. The integral differential pressure driven diaphragm valve will have a high durability capable of repeated operation. The opening and closing of the diaphragm valve is not prone to abnormality. It is particularly suitable for the control of cleaning water or etching chemicals with particles applied to the surface treatment equipment such as semiconductor, solar energy and electroplating, so as to reduce the maintenance, repair and replacement frequency of the diaphragm valve.

The main object II of the present invention is achieved by the following technical solutions.

An assembling method for a differential pressure driven diaphragm valve for manufacturing a differential pressure driven diaphragm valve with a separated drive chamber and a valve actuation chamber is presented, the assembling method including:

S1, providing a piston assembly, the piston assembly including an axially movable drive rod and a piston plate fixed on the drive rod, wherein an upper surface of the piston plate is provided with a groove for a plurality of eccentrically arranged elastic bodies to abut against;

S2, fixedly connecting the cylinder base of the differential pressure driven chamber and the valve cover of the valve actuation chamber by indirect screw connection near a shaft center and radial convex-convex limit at a periphery of the shaft;

S3, fixedly connecting the cylinder cover and the cylinder base of the differential pressure driven chamber in a threadedly snap connection manner, wherein a plurality of eccentrically arranged elastic bodies are disposed in the cylinder cover; the piston plate is positioned in the differential pressure driven chamber composed of the cylinder cover and the cylinder base; the elastic bodies have a preset elastic stroke, so that the elastic bodies do not provide an elastic force when the cylinder cover is just screwed with the cylinder base; one end of the drive rod is positioned in the central hole of the cylinder cover, and the other end of the drive rod is used for passing through the cylinder base and the valve cover; wherein the order of Step S2 and Step S3 is interchangeable;

S4, connecting the other end of the drive rod to a central connecting portion of the diaphragm piece via a shaft coupler, wherein the shaft coupler is detachably positioned inside the diaphragm press block and positioned on the diaphragm piece; a non-rotatable connection relationship is formed between the shaft coupler and the diaphragm press block, and a relatively rotatable connection relationship is formed between the shaft coupler and the drive rod; wherein the diaphragm pressure block has a plurality of peripheral teeth, and the valve cover has a plurality of longitudinal guide grooves for guiding the sliding of the peripheral teeth, so that a non-rotatable and relatively liftable limiting relationship is formed between the diaphragm pressure block and the valve cover;

S5, combining the valve cover and the valve base of the valve actuation chamber, wherein the diaphragm piece is positioned in the valve actuation chamber composed of the valve cover and the valve base, and the valve base has a first flow passage and a second flow passage which can be blocked by the diaphragm piece based on the descending operation of the diaphragm press block; at the same time, a non-rotatable connection relationship is formed between the periphery of the diaphragm and the valve cover and/or the valve base, and a non-rotatable connection relationship is formed between the center of the diaphragm piece and the shaft coupler.

In the present embodiment, a differential pressure driven diaphragm valve with a separated drive chamber and a valve actuation chamber is manufactured by a specific assembling method to solve the technical problems of poor valve sealing effect of the diaphragm piece due to eccentric stress of the drive rod and deterioration of durability of the diaphragm due to torsional stress of the drive rod or free rotation of the central connecting portion of the diaphragm piece.

The main object III of the present invention is to propose a differential pressure driven diaphragm valve, including:

a piston assembly including an axially movable drive rod and a piston plate fixed on the drive rod, wherein an upper surface of the piston plate is provided with a groove for a plurality of eccentrically arranged elastic bodies to abut against;

a cylinder valve body combination for composing a differential pressure driven chamber and a valve actuation chamber, including a cylinder cover, a cylinder base and valve cover integrated piece and a valve base, wherein the cylinder cover and the cylinder base and valve cover integrated piece are fixedly connected to each other in a threadedly snap connection manner; the piston plate is subjected to an upper and lower differential pressure to cause lifting and lowering in the differential pressure driven chamber and synchronously drives the lifting and lowering of the drive rod; a plurality of eccentrically arranged elastic bodies are disposed in the cylinder cover; the piston plate is positioned in the differential pressure driven chamber; the elastic bodies have a preset elastic stroke, so that the elastic bodies do not provide an elastic force when the cylinder cover is just screwed with the cylinder base and valve cover integrated piece; and one end of the drive rod is positioned in a central hole of the cylinder cover, and the other end of the drive rod is used for passing through the cylinder base and valve cover integrated piece which is combined with the valve base;

a diaphragm piece positioned in the valve actuation chamber for blocking a first flow passage and a second flow passage in the valve base, wherein a non-rotatable connection relationship is formed between the periphery of the diaphragm piece and the cylinder base and valve cover integrated piece;

a diaphragm press block positioned in the valve actuation chamber for pushing the blocks of the diaphragm piece; and a shaft coupler which connects the other end of the drive rod and a central connecting portion of the diaphragm piece so that a non-rotatable connection relationship is formed between the center of the diaphragm piece and the shaft coupler, wherein the shaft coupler is detachably positioned inside the diaphragm press block and positioned on the diaphragm piece, so that a relatively rotatable connection relationship is formed between the shaft coupler and the drive rod, and a non-rotatable connection relationship is formed between the shaft coupler and the diaphragm press block; wherein the diaphragm pressure block has a plurality of peripheral teeth, and the cylinder base and valve cover integrated piece has a plurality of longitudinal guide grooves for guiding the sliding of the peripheral teeth, so that a non-rotatable and relatively liftable limiting relationship is formed between the diaphragm pressure block and the cylinder base and valve cover integrated piece.

In this embodiment, the one component, the cylinder base and valve cover integrated piece replaces and simplifies the two components, the cylinder base and the valve cover, belonging to the special assembly of the automatic diaphragm valve, with the same effects corresponding to the corresponding features described above.

The main object IV of the present invention proposes an assembling method for a differential pressure driven diaphragm valve for manufacturing the differential pressure driven diaphragm valve of the main object III, including:

S11, providing a piston assembly;

S13, fixedly connecting the cylinder cover of the differential pressure driven chamber and the cylinder base and valve cover integrated piece in a threadedly snap connection manner; a plurality of eccentrically arranged elastic bodies are disposed in the cylinder cover;

S14, connecting the other end of the drive rod to the central connecting portion of the diaphragm piece by the shaft coupler; and S15, combining the cylinder base and valve cover integrated piece with the valve base of the valve actuation chamber.

In the present embodiment, a assembling method for a diaphragm valve in which the one component, a cylinder base and valve cover integrated piece replaces the two components, the cylinder base and the valve cover, is taught, with the same effects corresponding to the corresponding features described above.

The main object IV of the present invention is to provide a differential pressure driven diaphragm valve including a piston assembly, a cylinder valve body assembly having a differential pressure driven chamber separated from a valve actuation chamber, a diaphragm piece positioned in the valve actuation chamber for opening and closing and blocking a flow passage, wherein a drive rod of the piston assembly is capable of driving only a central connecting portion of the diaphragm piece to move up and down axially; the central connecting portion of the diaphragm piece adopts an internal guide mechanism of the valve actuation chamber to establish a non-rotatable limiting relationship with respect to a peripheral site of the diaphragm piece so as to reduce torsional stress of a soft diaphragm flexion of the diaphragm piece from corresponding deformation during the lifting and lowering of the central connecting portion of the diaphragm.

In this embodiment, by using the connection relationship of the drive rod of the piston assembly with respect to the central connecting portion of the diaphragm piece, a mechanism for preventing the central connecting portion of the diaphragm piece from self-rotation is established in the valve actuation chamber to block the driving rotation stress from the drive chamber, so that the driving rotation stress will not be transmitted to the soft diaphragm flexion of the diaphragm piece. The diaphragm piece has a longer service life and may withstand more valve opening and closing operations than those under conventional designs, and the diaphragm piece is not easily damaged.

In summary, the present invention includes at least one of the following technical effects contributing to the prior art.

1. Under the technical premise that the soft diaphragm flexion of the diaphragm piece is thin enough to effectively close the flow passage, the soft diaphragm flexion of the diaphragm piece can also reduce the eccentric stress from the drive rod and/or the pulling or torsional stress under the free rotation with the center of the diaphragm piece, thus improving the service life of the diaphragm. The opening of the flow passage is not limited without the deliberate thickening of the flexible membrane meandering part of the diaphragm, which meets the requirements of high-flow circulation.

2. The stress blocking between the differential pressure driven chamber and the valve actuation chamber is realized, and the internal structure of the diaphragm valve and/or the structural deficiencies of the diaphragm can be analyzed from the usage damage of the diaphragm piece.

3. The accuracy requirements of the drive rod of the piston assembly in the differential pressure driven chamber are reduced, and the piston assembly has a longer service life.

4. It prevents external liquid fluid from intruding into the valve actuation chamber with a specific ventilation structure under the premise of ventilation with the valve actuation chamber.

5. It breaks the inherent thinking that the traditional diaphragm valve adopts a spring sleeved on the periphery of the drive rod. The eccentric arrangement of a plurality of elastic bodies with a preset elastic stroke relative to the axis of the drive rod is used to jointly apply an elastic force to the piston plate of the piston assembly so as to reduce the eccentric stress of the drive rod. The axial lifting of the drive rod does not need a limit for preventing the self-rotation, and there is no additional force component friction, so that the axial lifting-lowering movement of the drive rod is smoother.

6. It effectively prevents the relative rotation between the cylinder base and the cylinder cover from changing the length space available for the elastic body to expand and contract in the differential pressure driven chamber.

7. Using a technical combination of a plurality of elastic mounting positions of the cylinder cover and a plurality of elastic bodies which are selectively mounted at the elastic mounting positions and have a preset elastic stroke, in a valve closed state in which the drive rod descends, the elastic force provided by the individual elastic bodies for the piston assembly becomes sufficiently small or does not need to provide an elastic force, so that the elastic bodies have a small or near-zero fixed elastic force which is compressed when extending, and the elastic bodies have a long service life.

8. Without affecting the flow passage blocking and sealing performance of the diaphragm valve, the diaphragm valve is easily assembled and quickly disassembled when the differential pressure driven diaphragm valve is assembled, It will not cause problems that it is difficult to assemble or disassemble the cylinder cover by the elastic force of the elastic body when the cylinder cover is initially assembled or disassembled.

DETAILED DESCRIPTION

Figure 1:
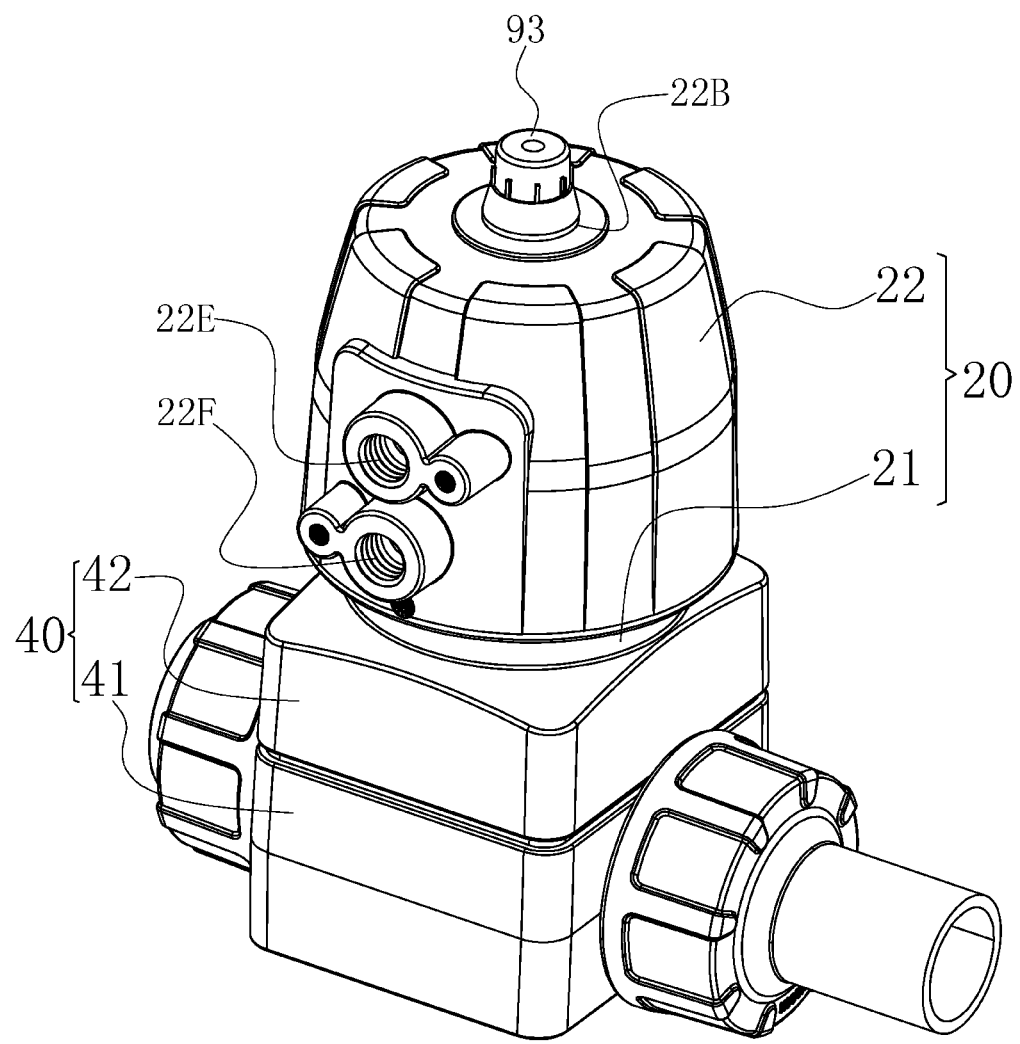
FIG. 1 illustrates a schematic perspective view of a differential pressure driven diaphragm valve with a separated drive chamber and a valve actuation chamber according to an embodiment of the present invention.

The technical solutions in the embodiments of the invention will be described clearly and completely in conjunction with the accompanying drawings in the embodiments of the invention. Obviously, the embodiments described are only part of the embodiments for understanding the invention idea of the invention, and do not represent all embodiments. Also, they provide an interpretation of the only embodiment. Based on the embodiments of the present invention, all other embodiments obtained by those of ordinary skill in the art upon understanding the inventive concept of the present invention fall within the scope of the present invention.

It should be noted that if directionality indications (such as up, down, left, right, front, rear.) are present in the embodiments of the present invention, the directionality indications are only used for explaining the relative positional relationship, movement condition and the like between each component under a certain posture. If the certain posture changes, the directionality indication changes accordingly. In order to facilitate an understanding of the technical solution of the present invention, a differential pressure driven diaphragm valve with a separated drive chamber and a valve actuation chamber and an easy-to-assemble and quick-to-disassemble assembling method thereof according to the present invention will be described and explained in further detail below, without limiting the scope of the present invention.

In some embodiments of the present application, FIGS. 1-6 illustrate a differential pressure driven diaphragm valve with a separated drive chamber and a valve actuation chamber. FIGS. 7 to 15 illustrate an assembling method for a differential pressure driven diaphragm valve. Based on the disclosure contained in the description, the parts shown in the drawings can represent common parts of multiple embodiments and can also represent specific parts of individual embodiments. The parts having differences or differences between different embodiments are described in words or presented in a manner compared with the figures. Therefore, on the basis of industrial characteristics and technical essence, a person skilled in the art would be able to correctly and reasonably understand and determine whether an individual technical feature or any multiple combinations thereof described below can be characterized to the same embodiment, or whether multiple technical features mutually exclusive in technical essence can be respectively characterized to different variant embodiments.

Figure 16:
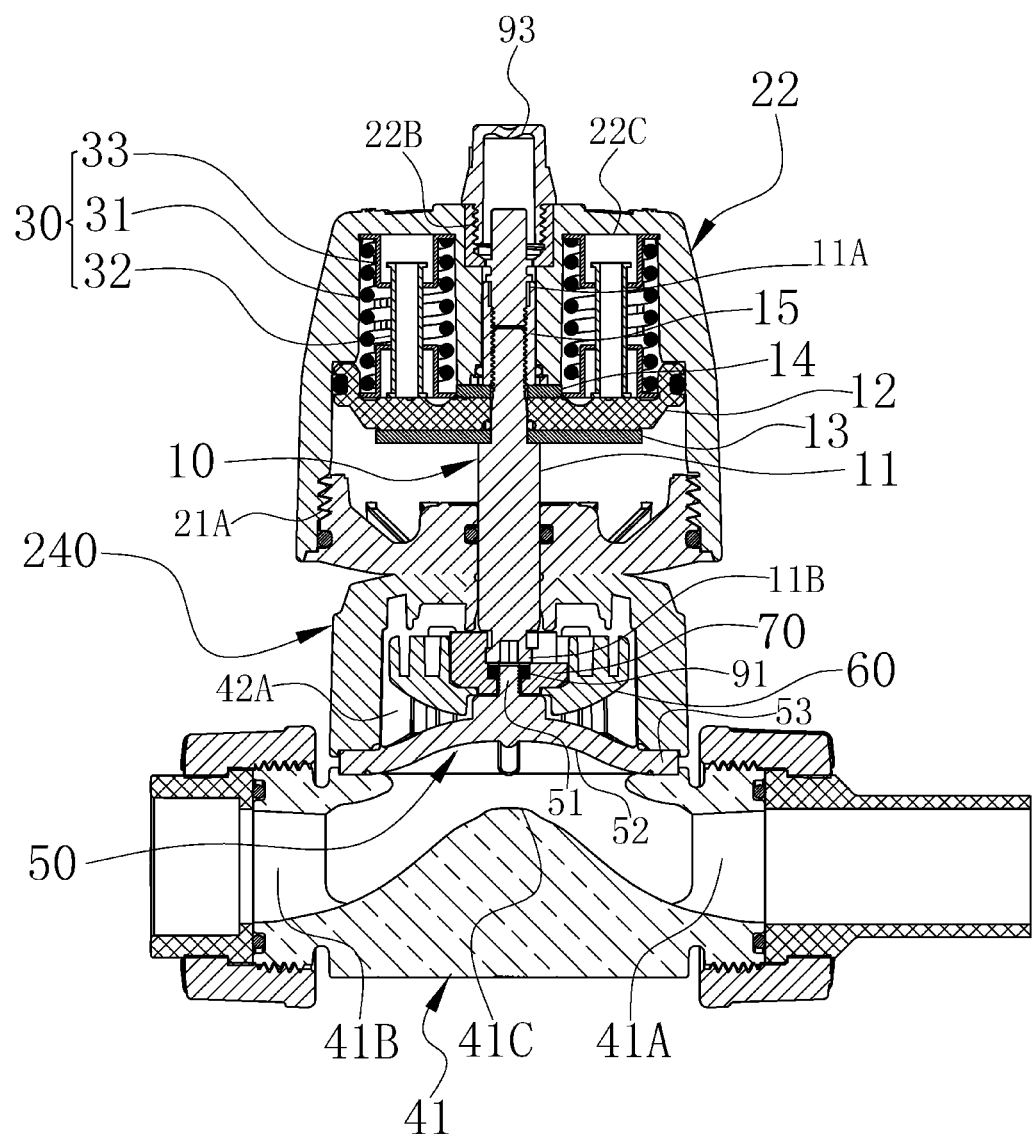
FIG. 16 illustrates a schematic cross-sectional view of a differential pressure driven diaphragm valve of another embodiment of the present invention taken along the direction of the flow passage with the valve in an open state.
Figure 17:
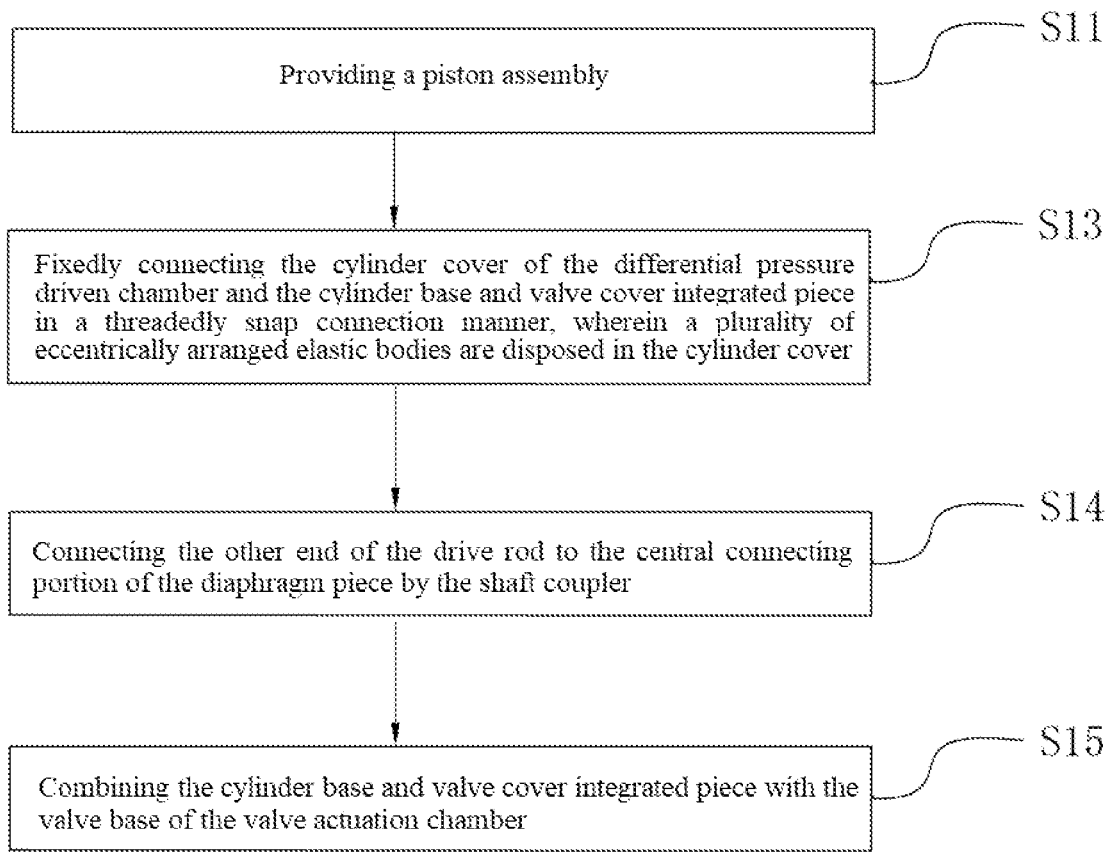
FIG. 17 illustrates a block flow diagram showing an assembling method for a differential pressure driven diaphragm valve according to another embodiment of the present invention.

In other embodiments of the present disclosure, FIG. 16 depicts a differential pressure driven diaphragm valve with the actuation chamber separated from the valve actuation chamber of the present disclosure. FIG. 17 illustrates an assembling method for a differential pressure driven diaphragm valve. The difference between the two types of embodiments is that in the first type of embodiment, the cylinder base 21 of the cylinder body and the valve cover 42 of the valve body are two separate components, and the valve body 40 can be used as a valve body corresponding to an automatic diaphragm valve in the present application, and can also be used as a valve body of a manual diaphragm valve, namely, a common concept that the valve body includes the valve cover. In the second type of embodiment, the cylinder base and valve cover integrated piece 240 incorporates the cylinder base and the valve cover structure as a dedicated valve body for the automatic diaphragm valve with fewer assembly steps, but without the features of a common valve cover. A person skilled in the art would be able to select an automatic diaphragm valve shared by valve bodies or a dedicated automatic diaphragm valve based on actual requirements.

The differential pressure driven diaphragm valve with the separated drive chamber and the valve actuation chamber, is a straight-stroke on-off mechanism which is suitable for an automatic control valve for the application of fluid containing particles, and the control of cleaning water or etching chemicals with particles applied to the surface treatment equipment such as semiconductor, solar energy and electroplating. The differential pressure driven diaphragm valve is also a kind of valve with a smaller dead zone of an inner cavity flow passage, and is more used in the occasions where water quality is required, such as an electronic ultrapure water pipeline system. The pneumatic diaphragm valve is also a valve having excellent sealing performance used in the system which easily produces hazardous chemicals or gases As shown in FIGS. 1-6, some embodiments of the present invention disclose a differential pressure driven diaphragm valve with a separated drive chamber and a valve actuation chamber, including: a piston assembly 10 which moves up and down based on a differential pressure in a differential pressure driven chamber, a cylinder body 20 positioned in an upper half of the valve for constituting the differential pressure driven chamber, a valve body positioned in a lower half of the valve for constituting the valve actuation chamber, a diaphragm piece 50 in the valve actuation chamber for opening and closing the valve, a diaphragm press block 60 in the valve actuation chamber for driving the diaphragm piece 50 to close the valve more tightly, and a shaft coupler 70 in the valve actuation chamber for connecting the drive rod 11 of the piston assembly 10 and the diaphragm piece 50 so as to drive the above-mentioned two axially in synchronization.

Figure 8:
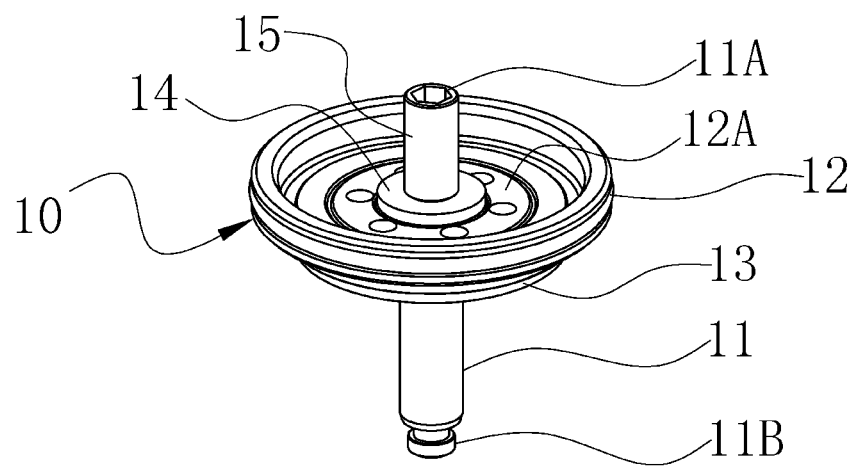
FIG. 8 illustrates a schematic view showing a piston assembly corresponding to Step S1 in an assembling method according to an embodiment of the present invention (FIG. 8(A) is a front perspective view, FIG. 8(B) is a rear perspective view, and FIG. 8(C) is a rear perspective view of a piston plate of the piston assembly)
Figure 8:
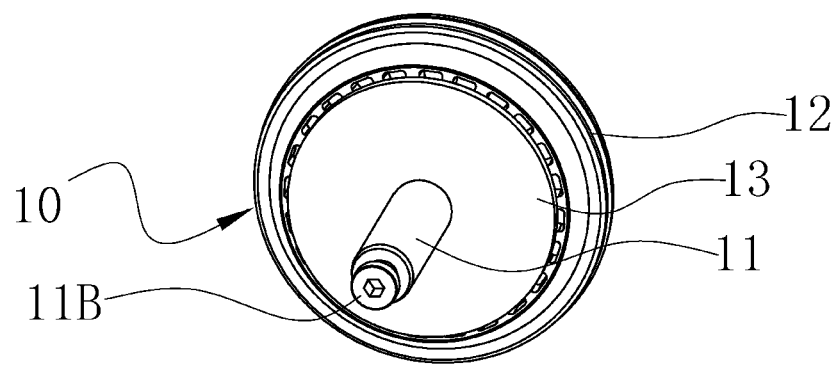
Figure 8:
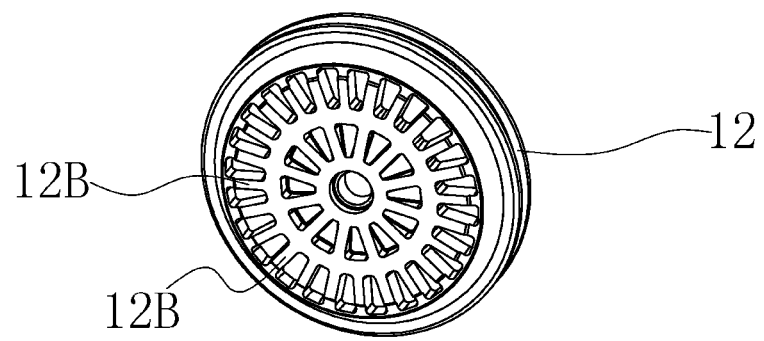

With reference to FIGS. 2 to 6 and with reference to FIG. 8, the piston assembly 10 includes an axially movable drive rod 11 and a piston plate 12 fixed on the drive rod 11. The upper surface of the piston plate 12 is provided with a groove 12A (see FIG. 8(A) for details) for a plurality of eccentrically arranged elastic bodies 30 to abut against. The drive rod 11 has a first end 11A positioned in a central hole 22B of the cylinder cover 22. In addition, the drive rod 11 also has a corresponding second end 11B which passes through the cylinder base 21 of the cylinder body 20 and the valve cover 42 of the valve body 40. Namely, the second end 11B of the drive rod 11 penetrates into the valve actuation chamber so as to synchronously drive a middle part of the diaphragm piece 50 to perform ascending valve opening and descending valve closing. The piston plate 12 divides the differential pressure driven chamber into an upper pressure chamber and a lower pressure chamber. The shapes of the drive rod 11 and the piston plate 12 in the figures are merely used to prove that the examples can be embodied. The drive rod and the piston plate may have other known shapes. The figures are not intended to be limiting and are the only practical shapes. A person skilled in the art would be able to adjust or modify other shapes having an equivalent function based on the technical disclosure of the present application. In alternative embodiments, since the drive rod accuracy requirements may be lower than that in the prior art with the particular diaphragm valve configuration of embodiments of the present invention, the drive rod 11 may also be formed using a combination of a long screw and an internally threaded sleeve, or other known mechanical configurations, to save assembly manufacturing cost for the drive rod 11.

Figure 10:
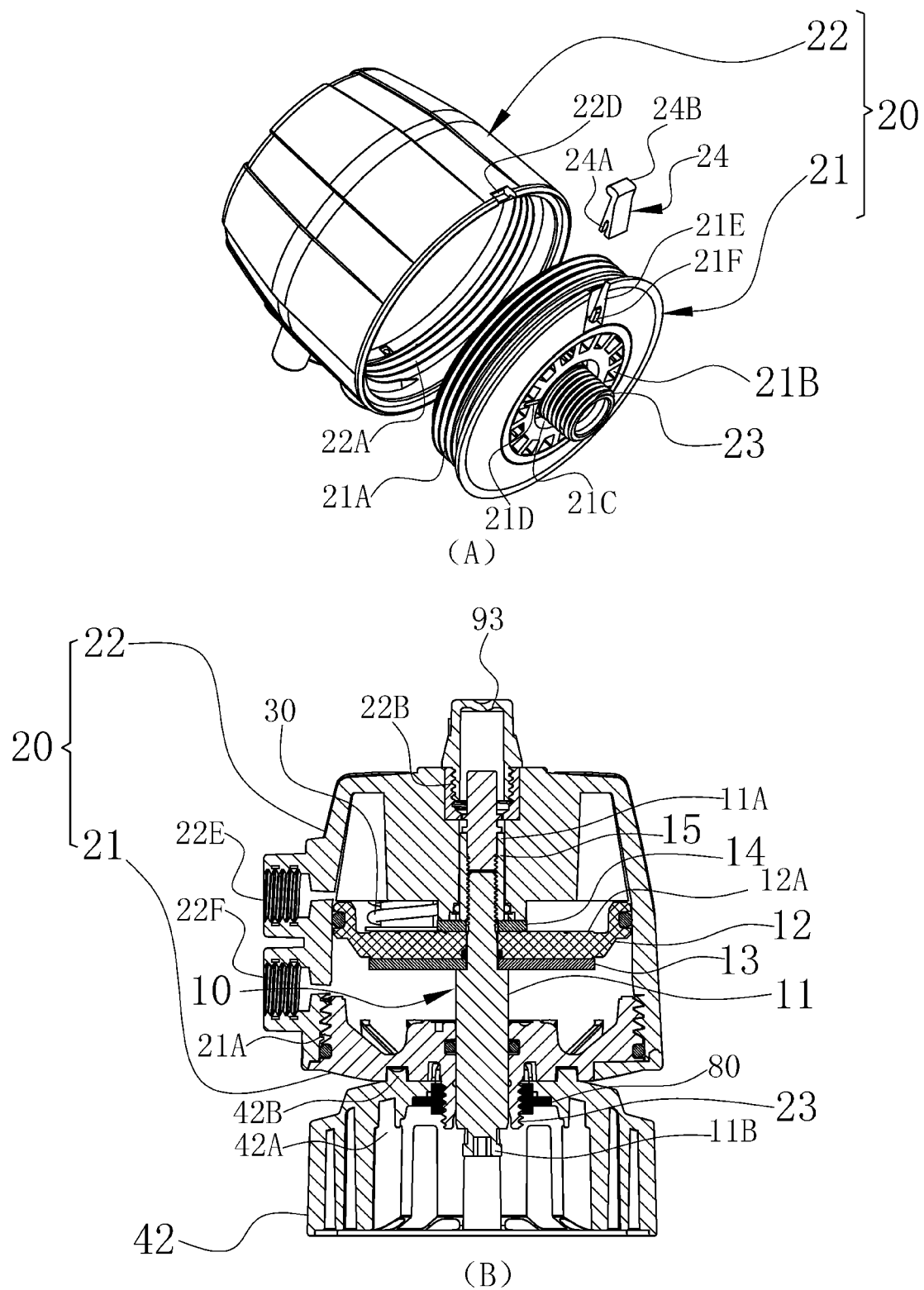
FIG. 10 illustrates a schematic view showing a cylinder cover and a cylinder base of the drive chamber being fixedly connected corresponding to Step S3 in the assembling method according to an embodiment of the present invention (FIG. 10(A) is a perspective view illustrating the combination of the cylinder cover and the cylinder base, and FIG. 10(B) is a sectional view illustrating the combination of the cylinder cover and the cylinder base)
Figure 11:
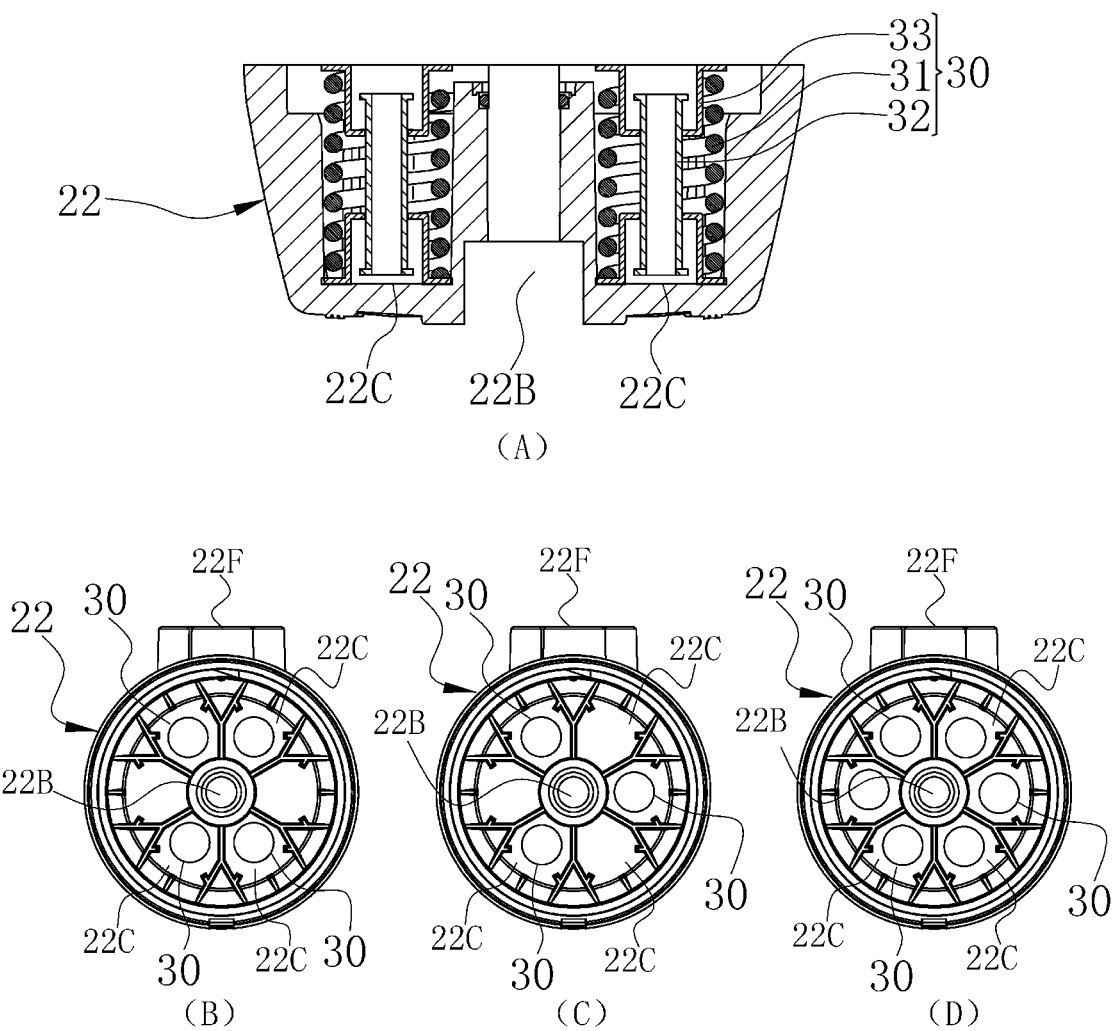
FIG. 11 illustrates a schematic view showing that a plurality of eccentrically arranged elastic bodies are arranged in the cylinder cover corresponding to Step S3 in the assembling method according to an embodiment of the present invention (FIG. 11(A) is a sectional schematic view showing the elastic bodies in the cylinder cover, FIG. 11(B) is a bottom schematic view showing the elastic bodies arranged in the cylinder cover in a first alternative manner, FIG. 11(C) is a bottom schematic view showing the elastic bodies arranged in the cylinder cover in a second alternative manner, and FIG. 11(D) is a bottom schematic view showing the elastic bodies arranged in the cylinder cover in a third alternative manner)

Referring to FIGS. 2 to 6 in combination with reference to FIG. 10(A), the cylinder body 20 includes a cylinder base 21 and a cylinder cover 22, which are fixedly connected to each other in a threadedly snap connection manner so as to constitute a differential pressure driven chamber. The piston plate 12 is lifted and lowered in the differential pressure driven chamber by the upper and lower pressure difference and synchronously drives the drive rod 11 to be lifted and lowered. With reference to FIG. 11, a plurality of eccentrically arranged elastic bodies 30 are disposed in the cylinder cover 22. The piston plate 12 is positioned in the differential pressure driven chamber. The elastic bodies 30 have a preset elastic stroke, so that the elastic bodies 30 do not provide an elastic force when the cylinder cover 22 is screwed with the cylinder base 21. The cylinder cover 22 is specifically provided with an upper chamber pressure hole 22E and a lower chamber pressure hole 22F, which are respectively in communication with the above-mentioned upper pressure chamber and lower pressure chamber. Based on the difference in driving fluid pressure in the corresponding communication between the upper chamber pressure hole 22E and the lower chamber pressure hole 22F, the differential pressure between the upper pressure chamber and the lower pressure chamber combined with the elastic force of the elastic body 30 drives the piston plate 12 to drive the inner space of the chamber to move up and down in the differential pressure driven chamber inside the cylinder body 20. Here, specifically, the driving fluid is air, and other gaseous or liquid fluids are not excluded. In the example, the cylinder base 21 has an external thread 21A positioned on the peripheral upward flange, and the cylinder cover 22 has an internal thread 22A positioned on the bottom peripheral edge (see FIG. 10(A) for details), so as to achieve a threaded connection of the cylinder base 21 and the cylinder cover 22. As to the "threadedly snap connection mode", it means that the screw connection fixing mode also has the effect of snap-in limiting, and a specific but non-limiting structure may be described in detail with reference to FIG. 10(A). The eccentric arrangement of the elastic body 30 and one of the specific but non-limiting configurations capable of providing a preset elastic stroke may be contrasted with FIGS. 11(A) and 11(B), described in detail later.

Figure 14:
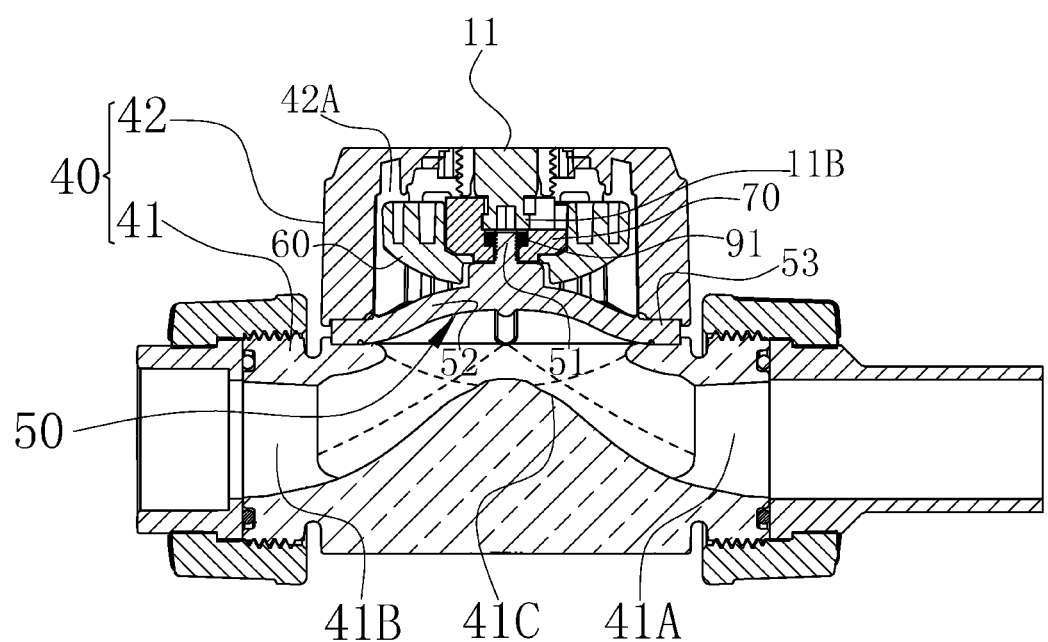
FIG. 14 illustrates a sectional view showing a valve base combining a valve cover with a valve base of a valve actuation chamber corresponding to Step S5 in the assembling method according to an embodiment of the present invention.
Figure 15:
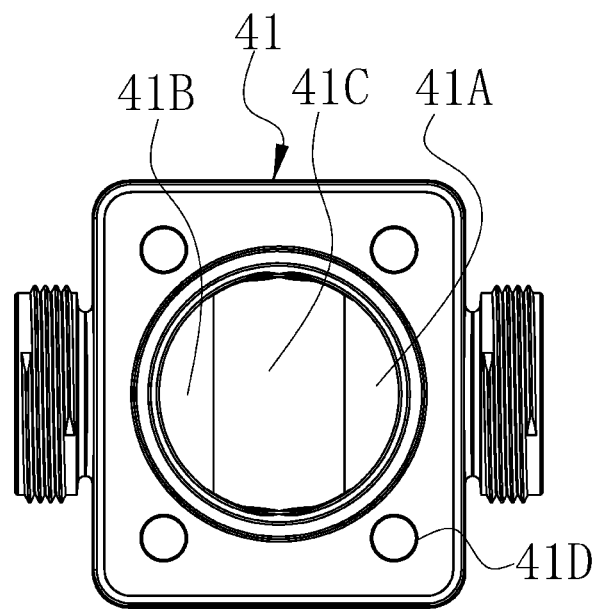
FIG. 15 illustrates a schematic view of a valve base corresponding to step S5 in the assembling method according to an embodiment of the present invention (FIG. 15(A) is a schematic top view of the valve base, and FIG. 15(B) is a schematic bottom view of the valve base)
Figure 15:
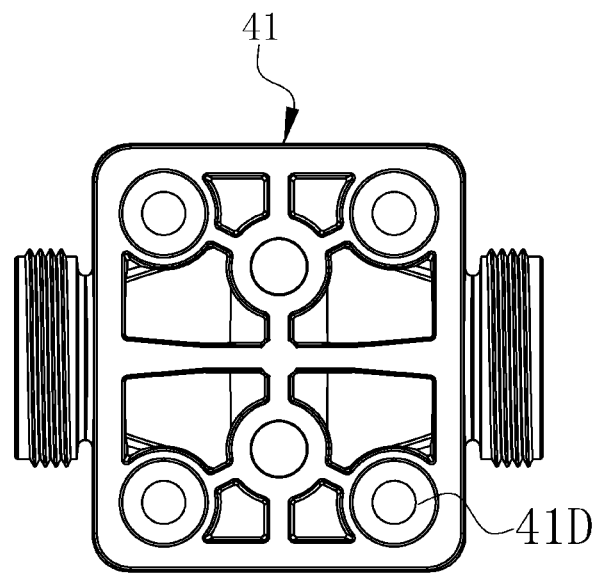

Referring to FIGS. 2-6 in combination with FIGS. 14 and 15, the valve body 40 includes a valve base 41 and a valve cover 42 combined to form a valve actuation chamber. With reference to FIG. 10(B), the cylinder base 21 is fixedly connected to the valve cover 42 by indirect screw connection near a shaft center and radial convex-convex limit at a periphery of the shaft. A specific but non-limiting structure of "a mode of a near-axis indirect screw connection and concave-convex limiting on the periphery of the shaft radial direction" may be compared with FIG. 10 and described in detail later.

Figure 3:
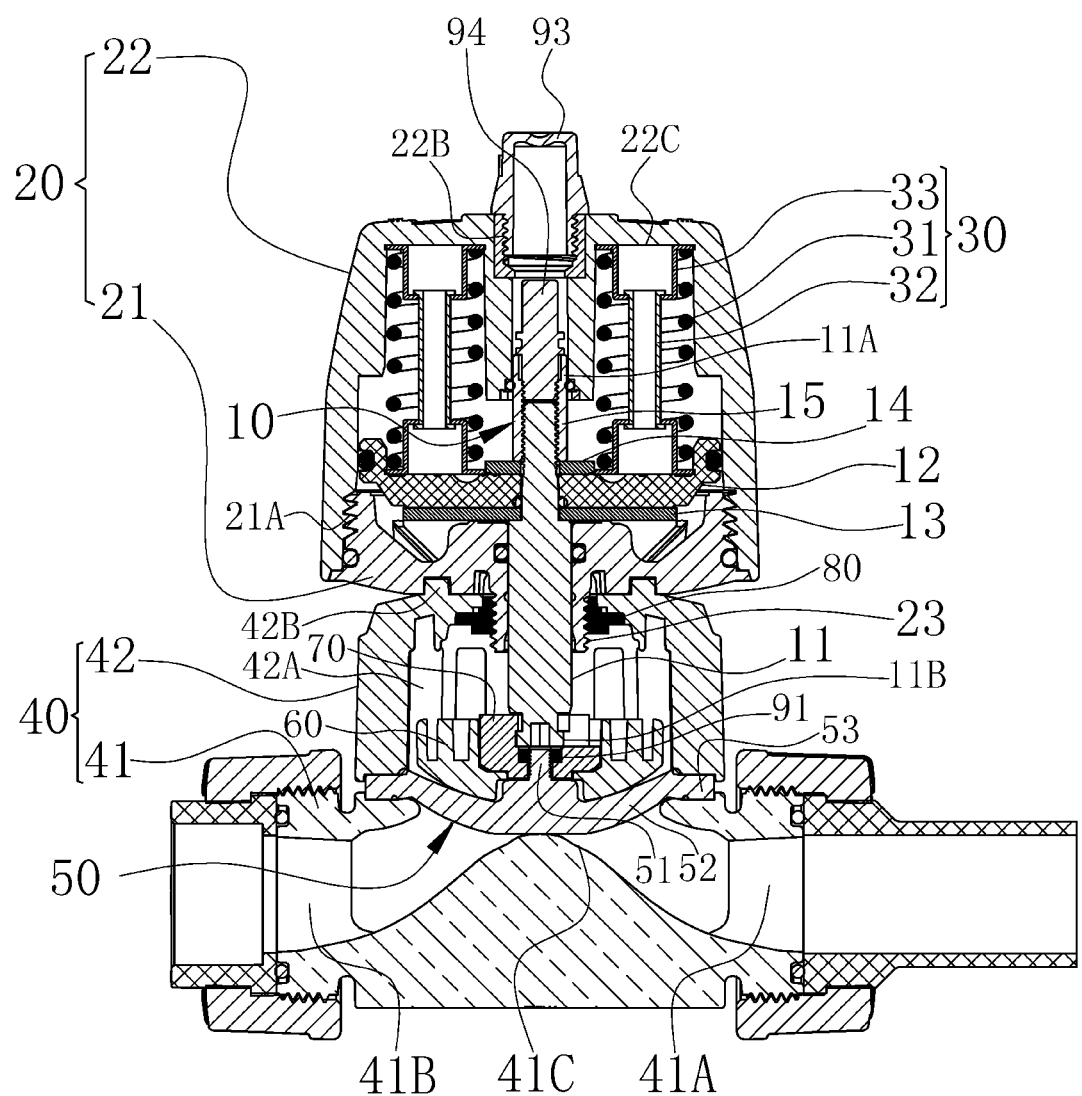
FIG. 3 illustrates a schematic cross-sectional view of a differential pressure driven diaphragm valve according to an embodiment of the present invention, taken along the direction of the flow passage with the valve in a closed state.
Figure 5:
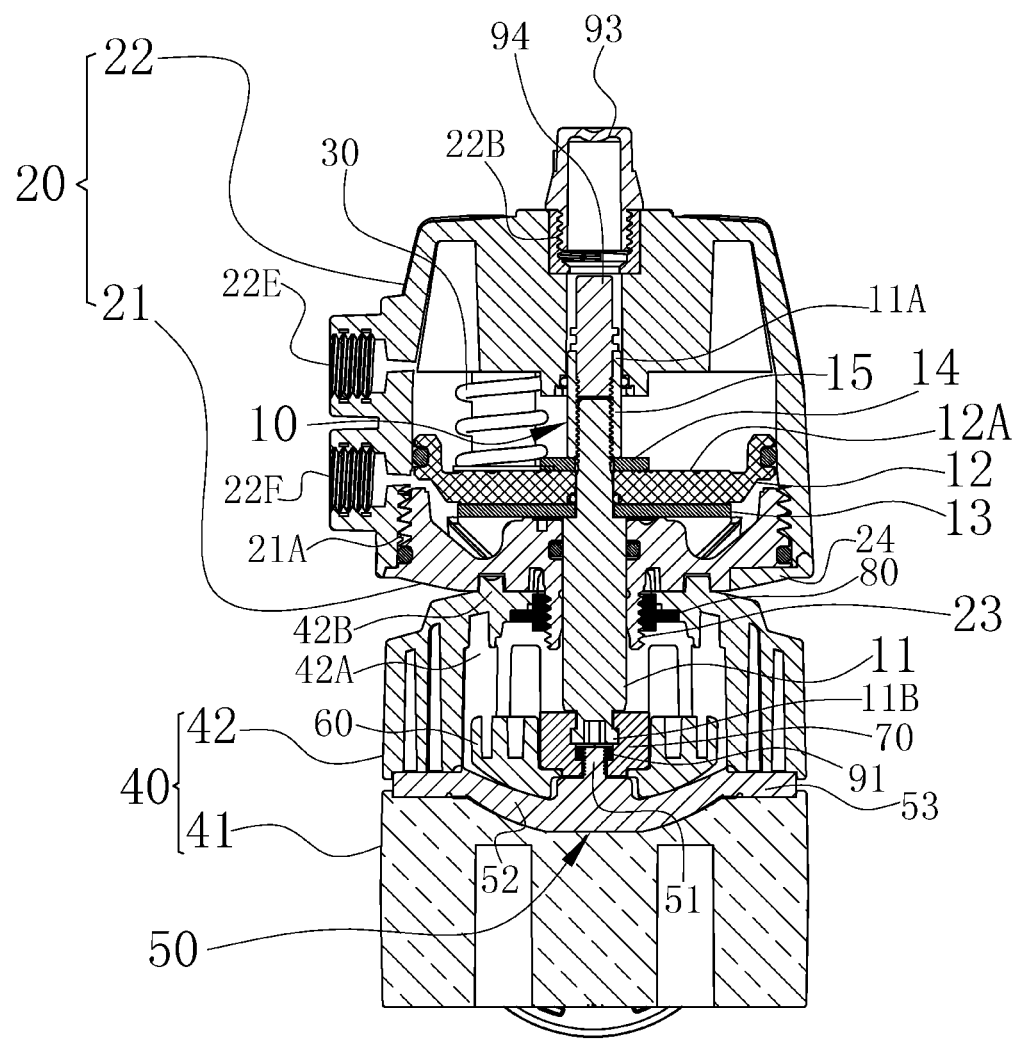
FIG. 5 illustrates a schematic cross-sectional view of a differential pressure driven diaphragm valve according to an embodiment of the present invention, taken along the direction of perpendicular to the flow passage with the valve in a closed state.
Figure 12:
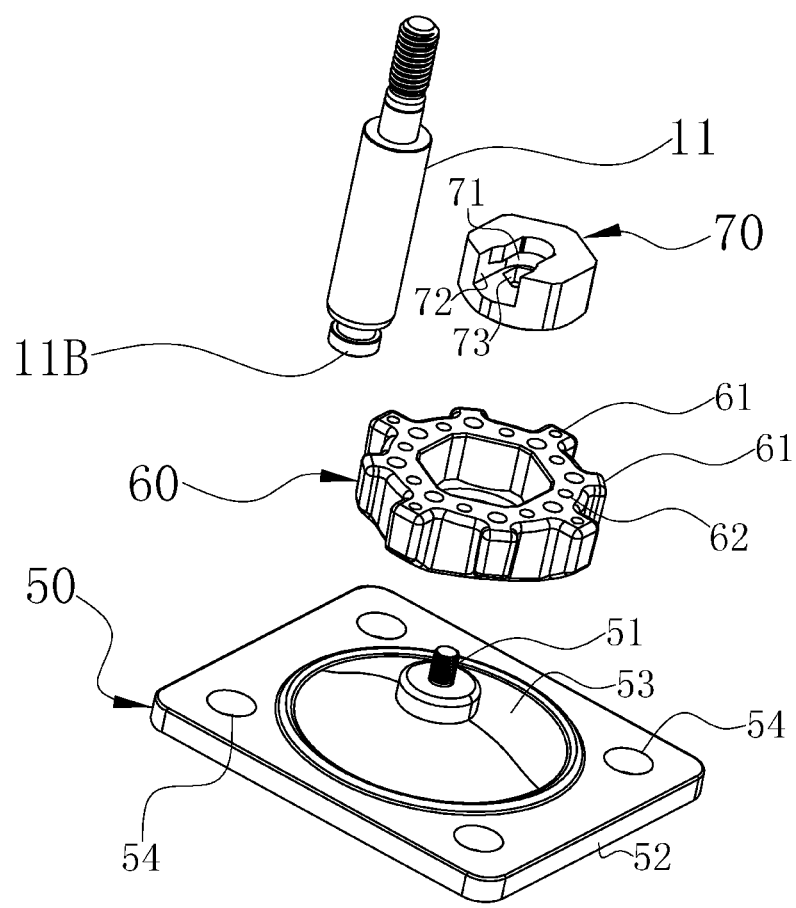
FIG. 12 illustrates a schematic perspective view of connecting the other end of the drive rod to the diaphragm piece by the shaft coupler corresponding to Step S4 in the assembling method according to an embodiment of the present invention.

Referring to FIGS. 3 and 5 in conjunction with FIG. 12, the diaphragm piece 50 is used to block a first flow passage 41A and a second flow passage 41B in the valve base 41. The periphery of the diaphragm piece 50 forms a non-rotatable connection relationship with the valve cover 42 and/or valve base 41. The diaphragm press block 60 is used for pushing the diaphragm piece 50 to be blocked. One of the main functions of the diaphragm press block 60 is specifically to restrict the shape of the soft diaphragm flexion 53 of the diaphragm piece 50 when the valve is closed, so as to better achieve valve sealing. In yet another hidden effect of the diaphragm press block 60, it keeps the central connecting portion 51 of the diaphragm piece 50 from freely rotating relative to the valve cover 42 and/or from being rotated by the torsion of the drive rod 11 during opening and closing of the valve. The diaphragm piece 50 has a central connecting portion 51, a peripheral site 52, and a soft diaphragm flexion 53 connecting the central connecting portion 51 and the peripheral site 52. During the valve opening and closing process, the central connecting portion 51 will be lifted or lowered in an axial direction, the position of the peripheral site 52 is fixed. The soft diaphragm flexion 53 will show outward straightening or downward indenting bending deformation with the axial lifting or lowering of the central connecting portion 51, respectively. The indenting bending shape of the soft diaphragm flexion 53 should follow the bottom surface contour of the diaphragm press block 60 as far as possible (as shown in FIGS. 3, 5 and 12 for details). Thus, the soft diaphragm flexion 53 cannot be too thick or thickened. It is known that in the prior art, the thickening or lamination at the soft diaphragm flexion increases the soft diaphragm flexion to resist torsional stress, but this will cause the valve closing of the diaphragm valve not to be dense. In an ideal model, it is desirable that the axial lifting and lowering at the central connecting portion 51 does not subject the soft diaphragm flexion 53 to axial torsional stress, i.e., the torsional stress applied to the soft diaphragm flexion 53 is eliminated or significantly reduced from the source.

Figure 2:
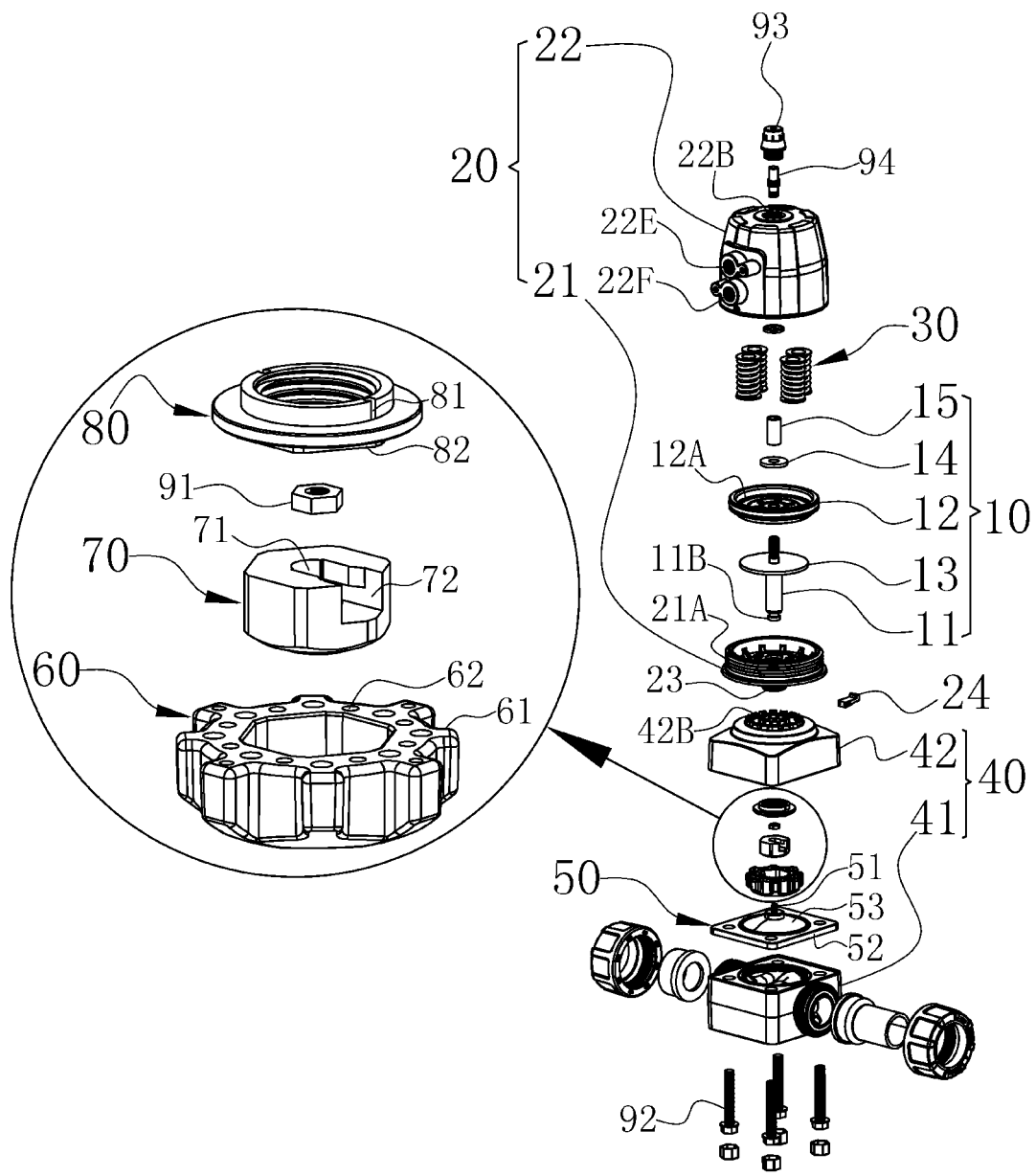
FIG. 2 illustrates a schematic exploded view of a differential pressure driven diaphragm valve with an separated drive chamber and a valve actuation chamber according to an embodiment of the present invention.
Figure 4:
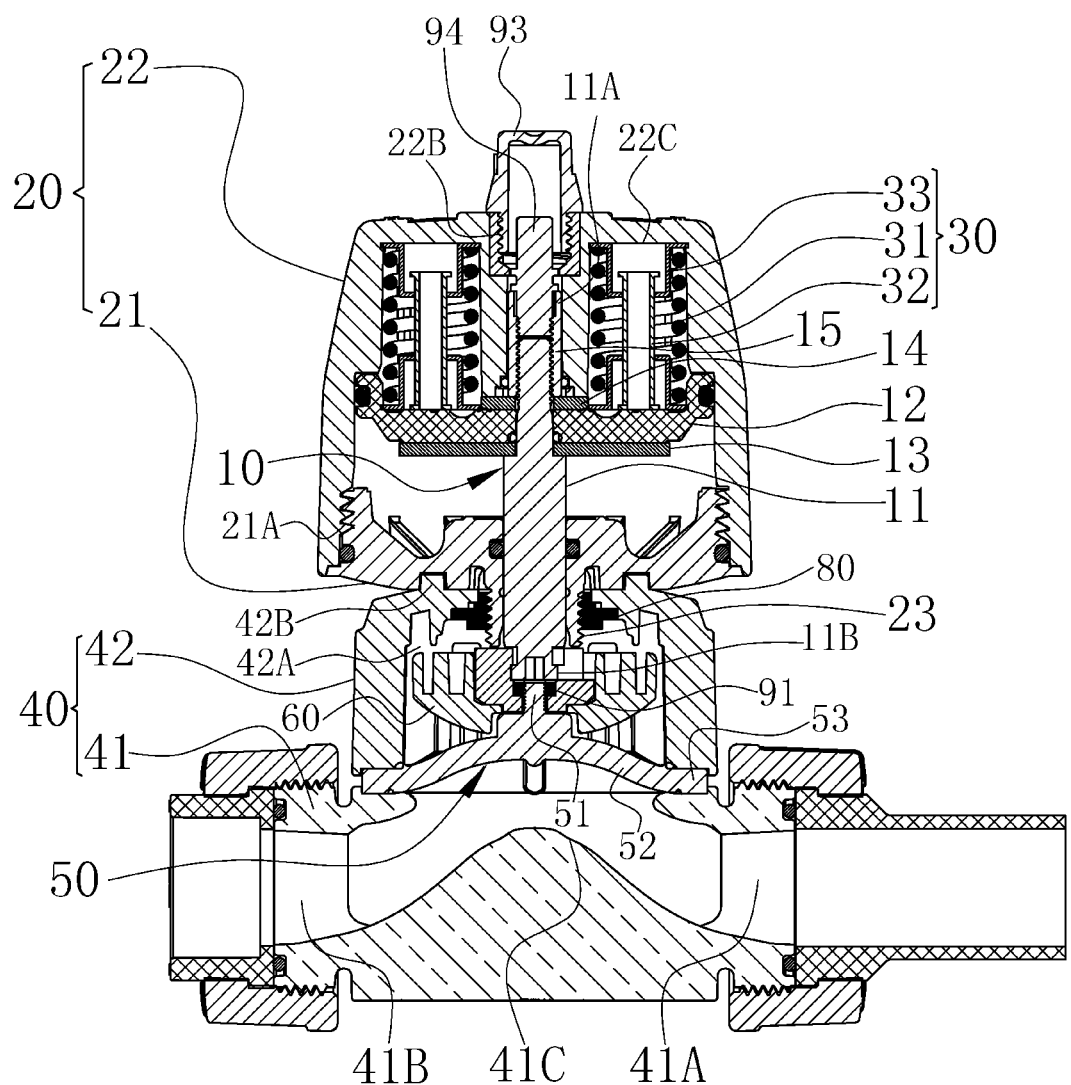
FIG. 4 illustrates a schematic cross-sectional view of a differential pressure driven diaphragm valve according to an embodiment of the present invention, taken along the direction of the flow passage with the valve in an open state.
Figure 6:
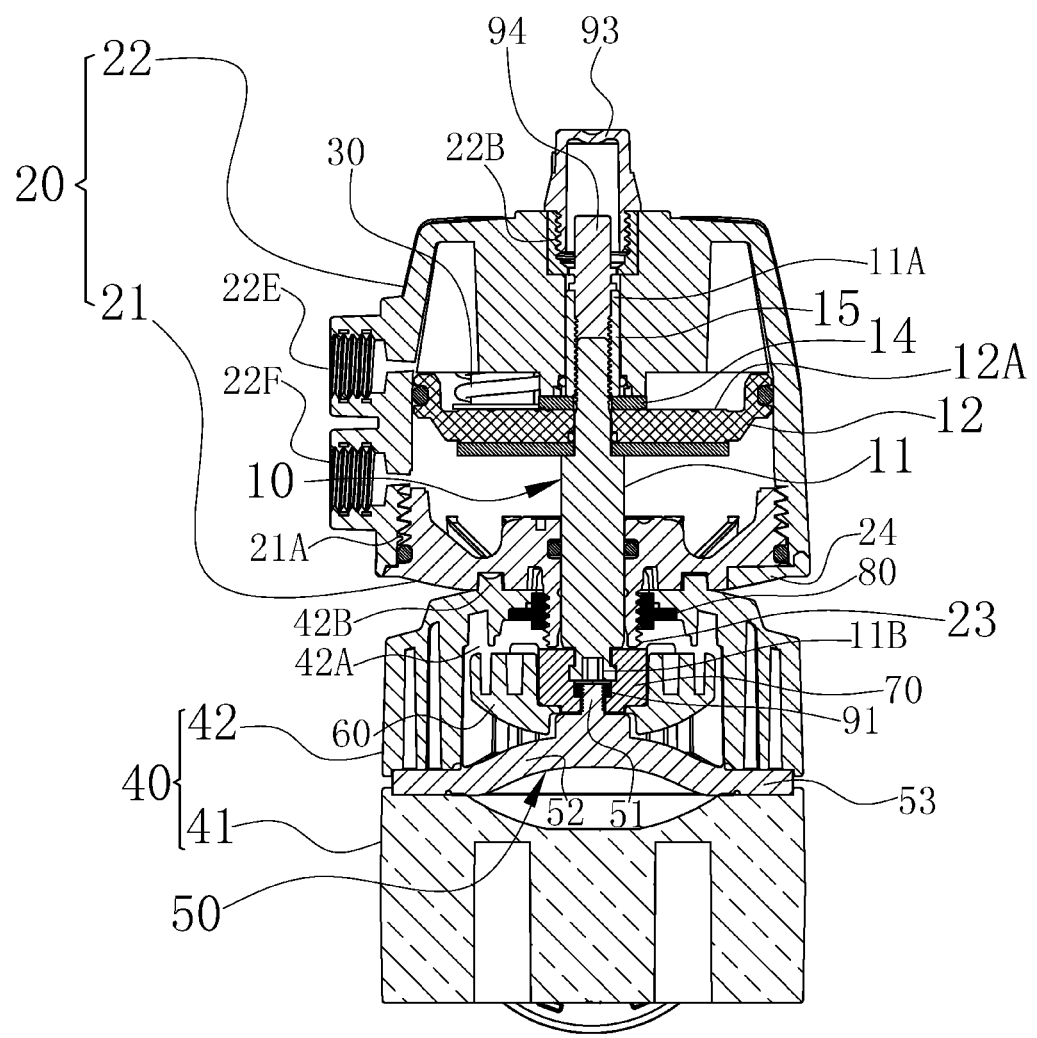
FIG. 6 illustrates a schematic cross-sectional view of a differential pressure driven diaphragm valve according to an embodiment of the present invention, taken along the direction perpendicular to the flow passage with the valve in an open state.
Figure 13:
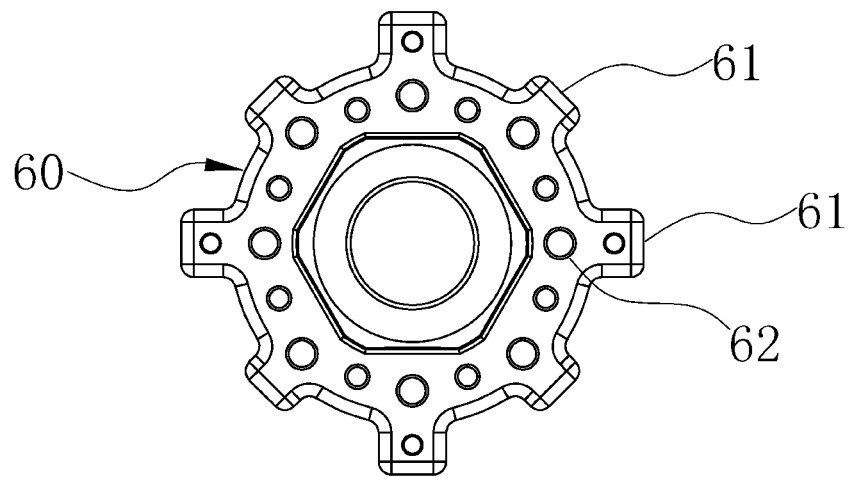
FIG. 13 illustrates a schematic view of a diaphragm press block corresponding to step S4 in the assembling method according to an embodiment of the present invention (FIG. 13(A) is a schematic top view of the diaphragm press block and FIG. 13(B) is a schematic bottom view of the diaphragm press block)
Figure 13:
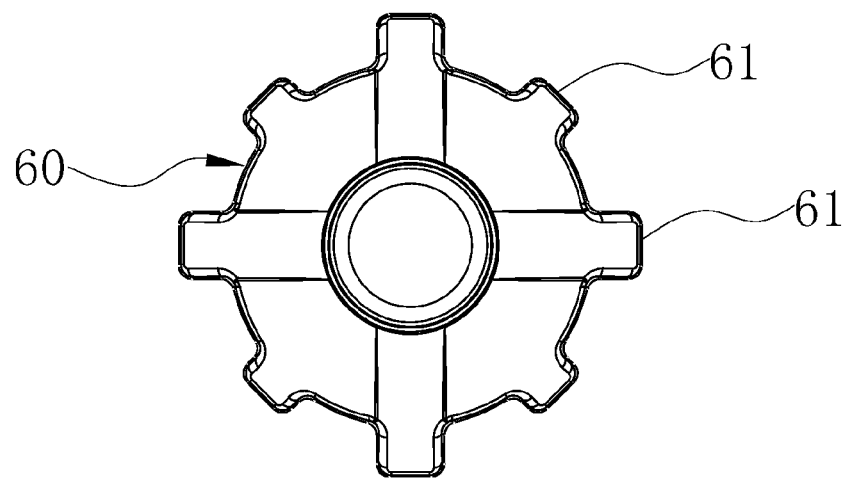

With reference to FIGS. 2, 4 and 6 and with reference to FIG. 12, the shaft coupler 70 connects the second end 11B of the drive rod 11 with the central connecting portion 51 of the diaphragm piece 50, so that a non-rotatable connection relationship is formed between the central connecting portion 51 of the diaphragm piece 50 and the shaft coupler 70. The shaft coupler 70 is detachably positioned in the diaphragm press block 60 and on the diaphragm piece 50 so as to form a relatively rotatable connection relationship between the shaft coupler 70 and the drive rod 11, and one detachable example structure can be seen in FIG. 12. A non-rotatable connection relationship is formed between the shaft coupler 70 and the diaphragm press block 60. With reference to FIGS. 12, 13 and 9(A), the diaphragm pressure block 60 has a plurality of peripheral teeth 61, and the valve cover 42 has a plurality of longitudinal guide grooves 42A for guiding the sliding of the peripheral teeth 61, so that a non-rotatable and relatively liftable limiting relationship is formed between the diaphragm press block 60 and the valve cover 42, namely, the diaphragm press block 60 may have lifting-lowering movement relative to the valve cover 42, but the diaphragm press block 60 cannot move rotationally relative to the valve cover 42. Preferably, the guide sliding relationship between the peripheral teeth 61 of the diaphragm press block 60 and the longitudinal guide groove 42A of the valve cover 42 is a vent-type guide sliding, so that the air pressure above the diaphragm press block 60 and the air pressure below the diaphragm press block 60 may be quickly kept consistent during the lifting and lowering process of the diaphragm press block 60. In the specific example, the slot depth of the longitudinal guide groove 42A is greater than the protruding length of the peripheral teeth 61 so as to form a channel above and below the diaphragm press block 60 at the groove bottom of the longitudinal guide groove 42A. However, without limitation, by virtue of the fact that the longitudinal guide groove 42A does not conform to the shape of the peripheral tooth 61 in cross-section, for example, by forming a longitudinal notch groove (not shown) in the outer side of the peripheral tooth 61, it is possible to form a channel above and below the diaphragm press block 60.

The implementation principle of the present embodiment is that, with reference to FIGS. 1-6, the combination of the relationship among the shaft coupler 70, the diaphragm press block 60 and the peripheral teeth 61 thereof and the longitudinal guide groove 42A of the valve cover 42 in the valve actuation chamber achieves that the center of the diaphragm piece 50 and the periphery do not rotate synchronously, and the central connecting portion 51 of the diaphragm piece 50 is not subjected to torsional stress from the drive rod 11 and is not freely twisted. The soft diaphragm flexion 53 of the diaphragm piece 50 is not subjected to torsional stress of the central connecting portion 51 with respect to the peripheral site 52 so as to shorten the uncontrollable service life of the diaphragm piece 50. In addition, the drive rod 11 only needs to drive the axial center of the central connecting portion 51 of the diaphragm piece 50 to rise and fall, and a blocking effect of the drive rod 11 on the torsional stress of the components inside the valve actuation chamber is formed between the differential pressure driven chamber and the valve actuation chamber at the driving axial center. During the driving of the valve switch, the drive rod 11 may be lifted and lowered axially and rotate freely without being constrained by the movement of the components inside the valve actuation chamber, and the accuracy requirement of the drive rod 11 may be more loose than that of the previous requirements. Furthermore, by using several eccentrically arranged elastic bodies 30 disposed at a fixed point in the cylinder cover 22, the inherent thinking that the existing spring is sleeved on the drive rod 11 is broken, and the elastic bodies 30 do not directly contact the drive rod 11. The drive rod 11 is jointly provided with an axial pressing elastic force of which the resultant force is not eccentric by the piston plate 12, thereby providing easy disassembling and repairing. The elastic bodies 30 have a preset elastic stroke, so that the elastic bodies 30 do not provide an elastic force when the cylinder cover 22 is screwed with the cylinder base 21. It also becomes light in assembly. In addition, the plurality of eccentrically arranged elastic bodies 30 will also have a longer service life. The integral differential pressure driven diaphragm valve will have a high durability capable of repeated operation. The opening and closing of the diaphragm valve is not prone to abnormality. By comparing the valve state of the valve in FIGS. 3 and 5 with the starting state of the valve in FIGS. 4 and 6, when the valve is closed, the soft diaphragm flexion 53 of the diaphragm piece 50 may better fit the flow passage junction of the valve base 41. When the valve is started, the soft diaphragm flexion 53 may better be pulled and deformed, so that the valve may both be closed well and open the passage well. The soft diaphragm flexion 53 is not subjected to the torsional stress from the central connecting portion 51, and also has good durable operation performance.

In a preferred example, referring to FIGS. 2 and 8(C), in order to reduce the friction jamming of the chamber wall on the lifting-lowering movement assembly and the wear on the chamber wall, the piston plate 12 and the diaphragm press block 60 are plastic parts, and the lower surface of the piston plate 12 is provided with a plurality of shape-maintaining legs 12B. Referring to FIG. 2, FIG. 12 and FIG. 13(A), the upper surface of the diaphragm press block 60 is provided with a plurality of upwardly opening shape-maintaining holes 62. With the above technical features, by using the material selection, the shape-maintaining leg 12B and the shape-maintaining hole 62, the piston plate 12 and the diaphragm press block 60 are lightweight and have a certain structural strength, respectively, and may perform individual functions well without damaging the inner walls of the drive chamber and the valve actuation chamber, so that the driving of the valve lifting and lowering is more sensitive. In a specific example, as shown in FIG. 8(C), the shape-maintaining leg 12B has a radiation distribution structure without affecting the elastic pressing contact of the elastic body 30 on the other surface.

In an embodiment, referring to FIGS. 2 and 8, the piston assembly 10 is of a combined type. The drive rod 11 is detachably connected to the piston plate 12. The upper and lower parts of the piston plate 12 are respectively provided with a limit structure. The drive rod 11 and the piston plate 12 form a relatively rotatable connection relationship. The upper and lower limit structures are specifically a lower limit plate structure 13 and an upper limit plate structure 14. The central axial holes of the lower limit plate structure 13, the piston plate 12 and the upper limit plate structure 14 are all sleeved through by a sleeving-through portion with a smaller rod diameter of the drive rod. The drive rod 11 is specifically provided with a guide slide rod body portion with an enlarged rod diameter, and a stepped ring portion for limiting the lower limit plate structure 13 is formed corresponding to the sleeving-through portion. The drive rod 11 is further assembled with an extension sleeve 15 above the upper limit plate structure 14, and the extension sleeve 15 is combined with the upper threaded rod body of the drive rod 11 in a threaded manner so as to limit the upper limit plate structure 14. Thus, the piston plate 12 may be limited and clamped by the lower limit plate structure 13 and the upper limit plate structure 14. When the above-mentioned technical features are used, the piston plate 12 is positioned at the upper and lower limits of the drive rod 11. The torsional stress of the piston plate 12 does not need to be completely synchronously transmitted to the drive rod 11. The drive rod 11 may be selected with a more rigid metal material and also has a longer service life. The lower limit plate structure 13 and the upper limit plate structure 14 also increase the structural strength of the piston plate 12. The lower limit plate structure 13 may be larger in size than the upper limit plate structure 14. In the embodiment, the upper end of the extension sleeve 15 is used as the first end 11A of the drive rod 11. The upper end of the extension sleeve 15 is provided with an inner hexagonal hole or other tool hole (specifically as shown in FIG. 8(A)) so as to drive the tightening of the extension sleeve 15.

Figure 9:
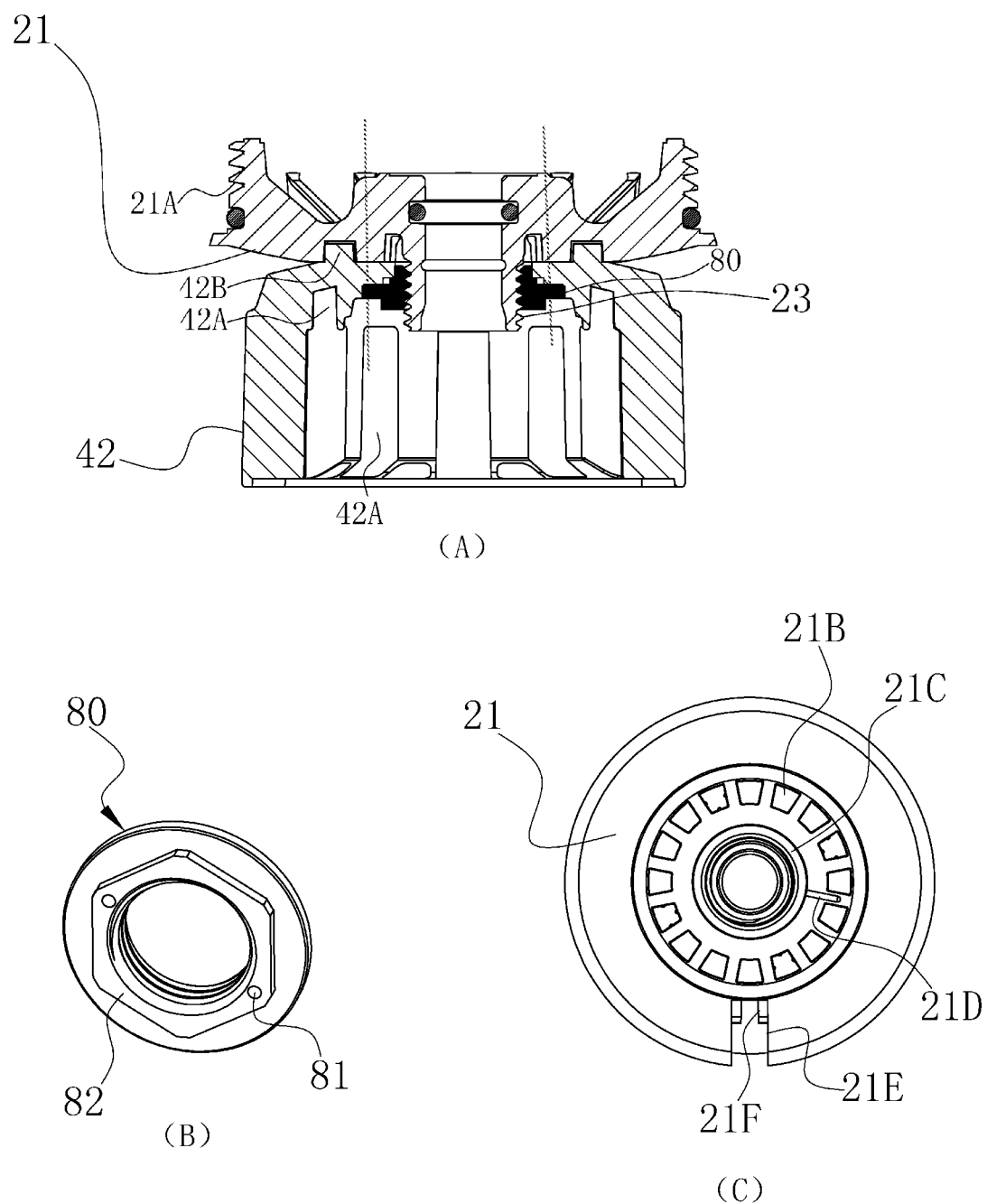
FIG. 9 illustrates a schematic view showing the fixed connection of a cylinder base of a drive chamber and a valve cover of a valve actuation chamber corresponding to Step S2 in the assembling method according to an embodiment of the present invention (FIG. 9(A) is a sectional schematic view after the cylinder base and the valve cover are combined, FIG. 9(B) is a perspective schematic view of the combining disc used, and FIG. 9(C) is a schematic view of the bottom surface of the cylinder base)

In an embodiment, with reference to FIGS. 2 and 9, with regard to the separate combination of the valve cover 42 and the cylinder base 21, in the form of a common valve body for an automatic valve and a manual valve, the diaphragm valve further includes a combining disc 80 (specifically as shown in FIG. 9(B)). The combining disc 80 is limited to the valve cover 42 and is threadedly connected to the externally threaded sleeve 23 protruding below the cylinder base 21 so as to constitute a near-axial center indirect threaded connection mode in which the cylinder base 21 is fixedly connected to the valve cover 42. The upper part of the valve cover 42 is provided with a convex tooth 42B in the shape of a circular wheel and protruding parallel to the axial direction. The lower part of the cylinder base 21 is provided with a concave tooth hole 21B corresponding to the convex tooth 42B (specifically as shown in FIGS. 9(C) and 10(A)), so as to constitute a mode of concave-convex limiting on the periphery of the shaft radial direction in which the cylinder base 21 is fixedly connected to the valve cover 42. Optionally, the combining disc 80 is provided with an axial vent hole 81 (specifically shown in FIG. 9(B)). With reference to FIGS. 9(C) and 10(A), the cylinder base 21 forms an annular air drain 21C at the periphery of the externally threaded sleeve 23. The bottom of the cylinder base 21 is provided with a radial vent groove 21D which is in communication with the outside, so that the outside air cannot easily enter the valve actuation chamber. When the above-mentioned optional technical features are used, the combination of the combining disc 80 and the connection relationship thereof, together with the feature combination of the convex teeth 42B provided on the upper part of the valve cover 42 and the concave tooth holes 21B provided on the lower part of the cylinder base 21, realizes that the cylinder base 21 and the valve cover 42 are in the form of a near-axis indirect screw connection and concave-convex limiting on the periphery of the shaft radial direction. That is to say, the cylinder base 21 and the valve cover 42 may be assembled and separated. The cylinder body 20 constituting the differential pressure driven chamber which is driven by the automatic valve may be combined above the valve body constituting the valve actuation chamber, and may also be used to combine a manual driving cylinder. The automatic valve and the manual valve have the property of sharing the valve body 40. The valve body 40 constituting the valve actuation chamber does not need to have a vent hole in the valve cover 42 but has a vent balancing effect to facilitate the lifting-lowering movement of the diaphragm press block 60. Optionally, the lower surface of the combining disc 80 forms a tool fixation site 82. By means of the tool fixation site 82 formed on the lower surface of the combining disc 80, the combining disc 80 and the cylinder base 21 may be pressed against each other to clamp the valve cover 42, ensure that the convex teeth 42B are not escaped from the concave tooth holes 21B, and allow the cylinder base 21 and the valve cover 42 to be fixedly integrated and detachably separated.

In an alternative embodiment, referring to FIG. 11(A), the elastic body 30 is a pre-tensioned spring. By using the elastic body 30 as a pre-tensioned spring, a plurality of eccentrically arranged elastic bodies 30 have a same maximum preset elastic stroke, so that it is possible to precisely control that no elastic force is provided by a plurality of elastic bodies 30 in the cylinder cover 22 when the cylinder cover 22 is threadedly connected to the cylinder base 21. In a specific example, the elastic body 30, which is specifically a pre-tensioned spring, includes a compression spring body 31, a stroke restricting body 32 sleeved therein by the compression spring body 31, and an elastic pin 33 movably lifted and lowered at two ends of the stroke restricting body 32, wherein the stroke restricting body 32 and the elastic pin 33 at the two ends constitute a telescopic rod structure with the help of the elastic force of the compression spring body 31, and the maximum extension stroke is limited by the end ring edge of the stroke restricting body 32 abutting against the periphery of the middle movable hole of the elastic pin 33, so that the elastic body 30 may preset an elastic stroke.

In an embodiment, referring to FIGS. 11 and 2, the cylinder cover 22 has a number of equally spaced elastic component mounting position 22C therein. The elastic body 30 is configured in a number less than or equal to the number of elastic component mounting position 22C and is optionally secured to some or all of the elastic component mounting position 22C. With the optional features described above, the elastic body 30 may be selectively secured to some or all of the elastic component mounting positions 22C by using a plurality of equally spaced elastic component mounting positions 22C within the cylinder cover 22 to allow for adaptive replacement or assembly of different numbers of elastic bodies 30 and adjust the appropriate spring force to accommodate different working fluid pressures and drive differentials. The formation of the elastic component mounting position 22C may be defined using a strip-shaped compartment side plate separation within the cylinder cover 22 (as shown in FIGS. 5, 6, 11(B), 11(C), and 11(D)). In the specific structure, with reference to FIGS. 11(B), 11(C) and 11(D), six elastic component mounting positions 22C are equally drawn in the cylinder cover 22 with the central hole 22B as the center. According to the magnitude of the required elastic force, the elastic component mounting positions 22C of FIG. 11(B) select part of the mounting positions to mount four elastic bodies 30 when the elastic force is required to be moderate. The elastic component mounting position 22C of FIG. 11(C) selects some mounting positions to mount three elastic bodies 30 when a light spring force is required. In the event of a heavy spring demand, the elastic component mounting position 22C of FIG. 11(D) selects all of the mounting positions to mount six elastic bodies 30. Since several elastic bodies 30 all have the same preset elastic stroke, it is a major characteristic of the technical solution of the present invention to keep the elastic body 30 installed not to provide elastic force when the cylinder cover 22 is threadedly connected to the cylinder base 21, no matter how many elastic bodies 30 are installed.

In an alternative example, referring to FIG. 11(A), the elastic component mounting position 22C has a stop bevel edge that tapers towards the bottom to slightly clamp the elastic body 30 into the elastic component mounting position 22C of the cylinder cover 22 and maintain the elastic body 30 at a radial clearance distance from the drive rod 11.

In an embodiment, referring to FIGS. 12 and 2, a snap-fit head formed at the second end 11B of the drive rod 11 snaps into an axial limit groove 71 of the shaft coupler 70 by a lateral notch 72 of the shaft coupler 70 to relatively rotatably connect the shaft coupler 70 and the drive rod 11. Referring to FIGS. 2 and 14, the differential pressure driven diaphragm valve further includes a diaphragm connector 91, a non-rotatable limiting recess 73 (see FIG. 12) positioned at the bottom of the axial limit groove 71 of the shaft coupler 70. The diaphragm connector 91 is fixedly connected to the central connecting portion 51 of the diaphragm piece 50 so as to connect the shaft coupler 70 and the diaphragm piece 50 with each other in a non-rotatable manner. When adopting the above-mentioned optional technical features, by using the snap-fit head at the second end 11B of the drive rod 11, the axial limit groove 71 of the shaft coupler 70 is snapped into via the lateral notch 72. In combination with the diaphragm press block 60, the shaft coupler 70 and the drive rod 11 which are radially limited in the valve actuation chamber, the snap-fit head (the second end 11B of the drive rod 11) will not be pulled out via the lateral notch 72 as long as the valve base 41 and the valve cover 42 are not disassembled. The lateral notch 72 does not require an additional sealing design. The drive rod 11 can rotate freely with respect to the shaft coupler 70, so as to realize the torsional stress blocking of the drive rod 11 in the valve actuation chamber.

In an embodiment, referring to FIGS. 2, 15, and 14, the diaphragm valve further includes a plurality of combining rods 92 connecting the valve cover 42 and the valve base 41 and passing through a plurality of through holes 54 of the diaphragm piece 50 at the peripheral site 52 (see FIG. 12 for details) so as to combine the valve cover 42 and the valve base 41 and fix the periphery of the diaphragm piece 50 non-rotatably. The combining rod 92 is specifically a connecting hole passing through the combination hole 41D of the valve base 41 and the through hole 54 of the diaphragm piece 50 and combined to the connecting hole of the valve cover 42. The opposite recess of the bottom of the valve base 41 at the outer end of the combining rod 92 may be fitted with a corrosion-resistant protective plug so that the combining rod 92 is not exposed.

Specifically, referring to FIGS. 14 and 15(A), a weir structure 41C is formed in the valve base 41 between the first flow passage 41A and the second flow passage 41B. With the optional features described above, the valve cover 42 is connected to the valve base 41 with the combining rod 92, and the peripheral site 52 of the diaphragm piece 50 is clamped. In the specific example, the use of the weir structure 41C eliminates the flow dead zone when the valve is open. It can be seen from FIG. 15(A) of the accompanying drawings that the weir structure 41C in the specific example is a concave bowl shape with a circular shape or an approximate circular shape. The two sides of the weir structure 41C are a first flow passage 41A and a second flow passage 41B

(shown in FIG. 14) which communicate with the bending slope. The concave bowl shape (shown in FIGS. 5 and 6) can be seen from FIG. 15(A) in which the weir structure 41C is cut perpendicular to the flow passage direction. As shown in FIG. 5, when the diaphragm press block 60 is pressed down by the drive rod 11, the soft diaphragm flexion 53 of the diaphragm piece 50 is deformed in compliance with the bottom shape of the diaphragm press block 60 until the soft diaphragm flexion 53 is pressed against the weir structure 41C to achieve a good valve sealing effect. As shown in FIG. 6, when the diaphragm press block 60 is lifted by the drive rod 11, the soft diaphragm flexion 53 of the diaphragm piece 50 is deformed in compliance with the pressure of the transmission fluid. The diaphragm piece 50 and the weir structure 41C of the valve base 41 form a space shaped like a flying disc where the transmission fluid does not have a flow dead zone and may pass through with a large flow rate.

In an embodiment, referring to FIGS. 1-6, the diaphragm valve further includes an opening degree adjusting member 93 disposed in the central hole 22B of the cylinder cover 22 to limit a highest rising position of the drive rod 11. With the above optional feature, the maximum opening degree of the diaphragm piece 50 is simultaneously adjusted by limiting the highest rising position of the drive rod 11 using the opening degree adjusting member 93. The diaphragm valve also includes an opening degree preset 94 is disposed in the central hole 22B of the cylinder cover 22 between the opening degree adjusting member 93 and the first end 11A of the drive rod 11. With reference to FIG. 3, the rotation adjustment of the opening degree adjusting member 93 may drive the opening degree preset 94 to be lifted and lowered axially. The function of the opening degree preset 94 is to use the length of the opening degree preset 94 to correct the adjustable range of the preset opening degree of the opening degree adjusting member 93 between the maximum opening degree of the valve and the valve closing. In an alternative example, as shown in FIGS. 3 and 4, the lower end of the opening degree preset 94 may pass through the inner hexagonal hole at the upper end of the extension sleeve 15 and be combined with the extension sleeve 15. The outer shaft of the opening degree preset 94 is provided with a limiting convex ring. The opening degree adjusting member 93 is provided with a limiting inner ring converted into lifting and lowering based on the rotational movement of the opening degree adjusting member 93. The limiting convex ring abuts against the limiting inner ring from below to top, so that the adjustable maximum opening degree of the valve is reached. The lifting of the opening degree preset 94 is hidden in the opening degree adjusting member 93, and the opening degree adjusting member 93 is not lifted and lowered itself. Therefore, the overall shape and structural assembly tightness of the diaphragm valve may be effectively maintained.

Specifically, with reference to FIGS. 10(A) and 10(B), a positioning notch 22D is disposed on a side of the opening of the cylinder cover 22. With reference to FIG. 9(C) and FIG. 10(A), the cylinder base 21 is provided with a clamping pin slot 21E. The bottom of the clamping pin slot 21E forms an urging strip 21F. Referring again to FIGS. 10(A) and 10(B), the clamping pin member 24 is inserted into the clamping pin slot 21E. The inner end notch 24A of the clamping pin member 24 is pressed against the urging strip 21F. The outer end stop block 24B of the clamping pin member 24 is snapped into the positioning notch 22D. In a specific example, by using the combination relationship of the positioning notch 22D of the cylinder cover 22, the clamping pin slot 21E of the cylinder base 21 and the clamping pin member 24, the mutual fixed connection of the cylinder base 21 and the cylinder cover 22 achieves a fixed-depth screw connection position in a threadedly snap connection manner and does not unscrew or screw each other, so as to fix the length space for accommodating the elastic body 30 in the differential pressure driven chamber and avoid elastic force supply errors.

Some embodiments of the present disclosure also provide an assembling method for a differential pressure driven diaphragm valve.

Figure 7:
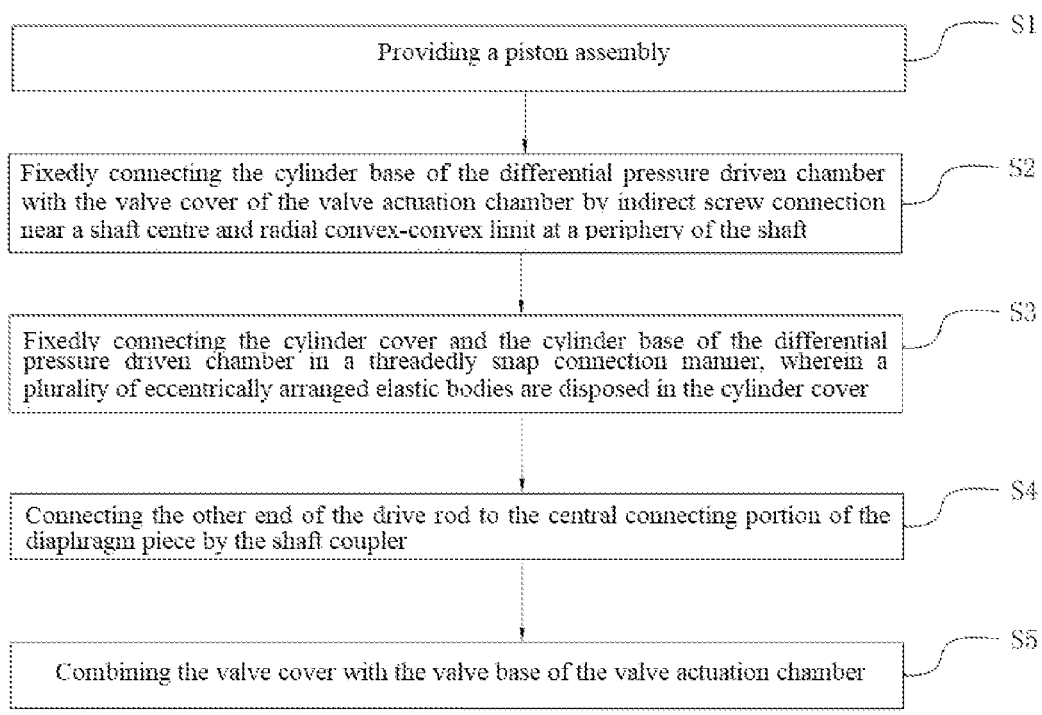
FIG. 7 illustrates a block flow diagram of a method for assembling a differential pressure driven diaphragm valve according to an embodiment of the present invention.

According to the assembling method, some embodiments of the present invention also provide an easy-to-assemble and quick-to-disassemble assembling method for a differential pressure driven diaphragm valve for manufacturing a differential pressure driven diaphragm valve with a separated drive chamber and a valve actuation chamber. With reference to FIG. 7, the assembling method includes steps S1 through S5 as described below.

Step S1, with reference to FIGS. 8 and 2, it provides a piston assembly 10. The piston assembly 10 includes an axially movable drive rod 11 and a piston plate 12 fixed on the drive rod 11. The upper surface of the piston plate 12 is provided with a groove 12A for a plurality of eccentrically arranged elastic bodies 30 to abut against.

Step S2, with reference to FIGS. 9 and 2 in combination, the cylinder base 21 of the differential pressure driven chamber and the valve cover 42 of the valve actuation chamber are fixedly connected by indirect screw connection near a shaft center and radial convex-convex limit at a periphery of the shaft.

Step S3, with reference to FIGS. 10, 11 and 2, the cylinder cover 22 and the cylinder base 21 of the differential pressure driven chamber are fixedly connected in a threadedly snap connection manner. A plurality of eccentrically arranged elastic bodies 30 are disposed in the cylinder cover 22. The piston plate 12 is positioned in the differential pressure driven chamber composed of the cylinder cover 22 and the cylinder base 21. The elastic bodies 30 have a preset elastic stroke, so that the elastic bodies 30 do not provide an elastic force when the cylinder cover 22 is just screwed with the cylinder base 21. The first end 11A of the drive rod 11 is positioned in the central hole 22B of the cylinder cover 22, and the second end 11B of the drive rod 11 is used for passing through the cylinder base 21 and the valve cover 42. Herein, the order of Step S2 and Step S3 is interchangeable.

Step S4, with reference to FIGS. 12, 13 and 2, the second end 11B of the drive rod 11 is connected to a central connecting portion 51 of the diaphragm piece 50 via the shaft coupler 70. The shaft coupler 70 is detachably positioned in the diaphragm press block 60 and positioned on the diaphragm piece 50. A non-rotatable connection relationship is formed between the shaft coupler 70 and the diaphragm press block 60, and a relatively rotatable connection relationship is formed between the shaft coupler 70 and the drive rod 11. The diaphragm press block 60 has a plurality of peripheral teeth 61, and the valve cover 42 has a plurality of longitudinal guide grooves 42A for guiding the sliding of the peripheral teeth 61, so that a non-rotatable and relatively liftable limiting relationship is formed between the diaphragm press block 60 and the valve cover 42.

Step S5, with reference to FIGS. 14, 15 and 2, the valve cover 42 and the valve base 41 of the valve actuation chamber are combined. The diaphragm piece 50 is positioned in the valve actuation chamber composed of the valve cover 42 and the valve base 41, and the valve base 41 has a first flow passage 41A and a second flow passage 41B which can be blocked by the diaphragm piece 50 based on the descending operation of the diaphragm press block 60.

At the same time, a non-rotatable connection relationship is formed between the periphery of the diaphragm piece 50 and the valve cover 42 and/or the valve base 41, and a non-rotatable connection relationship is formed between the center of the diaphragm piece 50 and the shaft coupler 70.

In the present embodiment, a differential pressure driven diaphragm valve with a separated drive chamber and a valve actuation chamber is manufactured by a specific assembling method (the partial structure of FIG. 14 corresponds to the overall structure of the same cut-away view of FIG. 4) to solve the technical problems of poor valve sealing effect of the diaphragm piece 50 due to eccentric stress of the drive rod 11 and deterioration of durability of the diaphragm piece 50 due to torsional stress of the drive rod 11 or free rotation of the central connecting portion 51 of the diaphragm piece 50.

In an embodiment, the piston plate 12 and the diaphragm press block 60 are plastic pieces. The lower surface of the piston plate 12 in Step S1 is provided with a plurality of shape-maintaining legs 12B. The upper surface of the diaphragm press block 60 in Step S4 is provided with a plurality of upwardly opening shape-maintaining holes 62. In an embodiment, in step S1, the piston assembly 10 is of a combined type. The drive rod 11 is detachably connected to the piston plate 12. The upper and lower parts of the piston plate 12 are respectively provided with a limiting structure. The drive rod 11 and the piston plate 12 form a relatively rotatable connection relationship. In an embodiment, in Step S2, the mode of near-axis indirect screw connection is specifically to screw and connect the externally threaded sleeve 23 protruding below the cylinder base 21 by the combining disc 80 limited to the valve cover 42. The mode of concave-convex limiting on the periphery of the shaft radial direction is specifically that the upper part of the valve cover 42 is provided with a circular wheel-shaped convex tooth 42B protruding in a parallel axial direction. The lower part of the cylinder base 21 is provided with a concave tooth hole 21B corresponding to the convex tooth 42B. Optionally, the combining disc 80 is provided with an axial vent hole 81. The cylinder base 21 forms an annular air drain 21C on the periphery of the externally threaded sleeve 23, and the bottom of the cylinder base 21 is provided with a radial vent groove 21D communicating to the outside. Alternatively, referring to FIG. 9(B), the lower surface of the combining disc 80 is formed with a tool fixation site 82, specifically, an outer hexagonal flange. It is tool-fixed at one side of the tool fixation site 82 to form a pressing clamping force between the inner thread of the combining disc 80 and the outer thread sleeve 23 of the cylinder base 21 to combine the valve cover 42 with the cylinder base 21.

In an embodiment, in step S3, the cylinder cover 22 has a plurality of equally divided elastic component mounting positions 22C. The elastic body 30 is configured in a number equal to or less than the number of elastic component mounting positions 22C, which is optionally fixed to some or all of the elastic component mounting positions 22C. In an embodiment, in step S3, the threadedly snap connection manner specifically includes that a positioning notch 22D is provided on the side edge of the opening of the cylinder cover 22. A clamping pin slot 21E is provided on the cylinder base 21. An urging strip 21F is formed at the bottom of the clamping pin slot 21E. The clamping pin member 24 is inserted into the clamping pin slot 21E. An inner end notch 24A of the clamping pin member 24 is pressed against the urging strip 21F, and an outer end stop block 24B of the clamping pin member 24 is clamped in the positioning notch 22D.

In an embodiment, in Step S4, the manner in which the shaft coupler 70 is connected to the drive rod 11 includes that the snap-fit head formed by the second end 11B of the drive rod 11 is snapped into the axial limit groove 71 of the shaft coupler 70 via the lateral notch 72 of the shaft coupler 70. The manner in which the shaft coupler 70 is connected to the diaphragm piece 50 includes that the central connecting portion 51 of the diaphragm piece 50 is threadedly connected to the diaphragm connector 91, and the diaphragm connector 91 is non-rotatably limited to the limiting recess 73 at the bottom of the axial limit groove 71 of the shaft coupler 70.

In an embodiment, the manner of combining the valve cover 42 to the valve base 41 in step S5 includes connecting the valve cover 42 with the valve base 41 using a plurality of combining rods 92 and passing through a plurality of through holes 54 in the periphery of the diaphragm piece 50.

The preferred technical features described above provide a specific assembling method of a differential pressure driven diaphragm valve with a separated drive chamber and the valve actuation chamber, with the resulting performance corresponding to the features described above.

Still other embodiments of the present invention provide a differential pressure driven diaphragm valve. Referring to FIG. 16, the differential pressure driven diaphragm valve includes a piston assembly 10, a cylinder valve body combination for constituting a differential pressure driven chamber and a valve actuation chamber, a diaphragm piece 50, a diaphragm press block 60 and a shaft coupler 70. Other embodiments differ from the previous embodiments only in that the cylinder valve body combination includes a cylinder base and valve cover integrated piece 240 that replaces the cylinder base and valve cover 42 of the separable combination. Parts of the same features not depicted in drawings of other embodiments may be compared to the previously described embodiments.

The piston assembly 10 includes an axially movable drive rod 11 and a piston plate 12 fixed to the drive rod 11. The upper surface of the piston plate 12 is provided with a groove 12A for a plurality of eccentrically arranged elastic bodies 30 to abut against.

The cylinder valve body combination includes a cylinder cover 22, a cylinder base and valve cover integrated piece 240 and a valve base 41. The cylinder cover 22 and the cylinder base and valve cover integrated piece 240 are fixedly connected to each other in a threadedly snap connection manner, and the piston plate 12 is subjected to an upper and lower pressure difference and thus lifted and lowered in the differential pressure driven chamber and synchronously drives the drive rod 11 to be lifted and lowered. A plurality of eccentrically arranged elastic bodies 30 are disposed in the cylinder cover 22. The piston plate 12 is positioned in the differential pressure driven chamber, and the elastic bodies 30 have a preset elastic stroke, so that the elastic bodies 30 do not provide an elastic force when the cylinder cover 22 and the cylinder base and valve cover integrated piece 240 are just screwed. Also, the first end 11A of the drive rod 11 is positioned in the central hole 22B of the cylinder cover 22, and the second end 11B of the drive rod 11 is used to pass through the cylinder base and valve cover integrated piece 240. The cylinder base and valve cover integrated piece 240 is combined with the valve base 41.

The diaphragm piece 50 is positioned in the valve actuation chamber for blocking the first flow passage 41A and the second flow passage 41B in the valve base 41. The perimeter of diaphragm piece 50 forms a non-rotatable connection with the cylinder base and valve cover integrated piece 240.

The diaphragm press block 60 is positioned within the valve actuation chamber to drive the diaphragm piece 50 for blocking. The shaft coupler 70 connects the second end 11B of the drive rod 11 with the central connecting portion 51 of the diaphragm piece 50, so that a non-rotatable connection relationship is formed between the center of the diaphragm piece 50 and the shaft coupler 70. The shaft coupler 70 is detachably positioned in the diaphragm press block 60 and positioned on the diaphragm piece 50, so that a relatively rotatable connection relationship is formed between the shaft coupler 70 and the drive rod 11, and a non-rotatable connection relationship is formed between the shaft coupler 70 and the diaphragm press block 60. Herein, the diaphragm press block 60 has a plurality of peripheral teeth 61, and the cylinder base and valve cover integrated piece 240 has a plurality of longitudinal guide grooves 42A for guiding the sliding of the peripheral teeth 61, so that a non-rotatable and relatively liftable limiting relationship is formed between the diaphragm press block 60 and the cylinder base and valve cover integrated piece 240.

In this embodiment, the one component, the cylinder base and valve cover integrated piece 240, replaces and simplifies the two components, the cylinder base 21 and the valve cover 42, belonging to the special component of the automatic diaphragm valve, with the corresponding effects as described for the corresponding features above.

The present invention also provides an easy-to-assemble and quick-to-disassemble assembling method of a differential pressure driven diaphragm valve for manufacturing a differential pressure driven diaphragm valve according to further embodiments described above, with reference to FIG. 17, the assembling method including:

Step S11, providing a piston assembly 10;

Step S13, fixedly connecting the cylinder cover 22 of the differential pressure driven chamber and the cylinder base and valve cover integrated piece 240 in a threadedly snap connection manner, wherein a plurality of eccentrically arranged elastic bodies 30 are disposed in the cylinder cover 22;

Step S14, connecting the second end 11B of the drive rod 11 to the central connecting portion 51 of the diaphragm piece 50 via the shaft coupler 70; and Step S15, combining the cylinder base and valve cover integrated piece 240 with the valve base 41 of the valve actuation chamber.

In the present embodiment, an assembling method for a diaphragm valve in which the one component, a cylinder base and valve cover integrated piece 240 replaces the two components, the cylinder base 21 and the valve cover 42 is taught, with the same effects corresponding to the corresponding features described above.

On the other hand, it can be seen from the solution that the numerous examples of the present invention also propose a differential pressure driven diaphragm valve, including a piston assembly 10, a cylinder valve body combination with a differential pressure driven chamber separated from a valve actuation chamber, a diaphragm piece 50 positioned in the valve actuation chamber for opening and closing and blocking a flow passage. A drive rod 11 of the piston assembly 10 may only drive a central connecting portion 51 of the diaphragm piece 50 to move up and down axially. The central connecting portion 51 of the diaphragm piece 50 adopts an internal guide mechanism of the valve actuation chamber to form a non-rotatable limiting relationship with respect to a peripheral site 52 of the diaphragm piece 50 so as to reduce torsional stress of a soft diaphragm flexion 53 of the diaphragm piece 50 from corresponding deformation during the lifting and lowering of the central connecting portion 51 of the diaphragm piece 50. In the present embodiment, by utilizing the connection relationship of the drive rod 11 of the piston assembly 10 with respect to the central connecting portion 51 of the diaphragm piece 50. A mechanism is established within the valve actuation chamber to prevent the central connecting portion 51 of the diaphragm piece 50 from rotating so as to block the drive rotational stress from the drive cavity, which is thus not transmitted to the soft diaphragm flexion 53 of the diaphragm piece 50. The diaphragm piece 50 has a longer service life and may withstand more valve opening and closing operations than in conventional designs. The diaphragm piece 50 is not easily damaged.

In an embodiment, the diaphragm valve further includes a shaft coupler 70 connecting the second end 11B of the drive rod 11 with the central connecting portion 51 of the diaphragm piece 50 for blocking the transmission of the torsional stress of the drive rod 11 to the central connecting portion 51 of the diaphragm piece 50. Specifically, the internal guide mechanism of the valve actuation chamber includes a longitudinal guide slide mechanism of the diaphragm press block 60 within the valve actuation chamber. With the optional features described above, the shaft coupler 70 blocks torsional stress on the drive rod 11. In the specific example, it is also optional to limit the free rotation of the central connecting portion 51 of the diaphragm piece 50 during lifting and lowering by means of the longitudinal guide sliding mechanism of the diaphragm press block 60 in the valve actuation chamber.

The embodiments of the detailed description are considered as preferred embodiments for the purpose of facilitating the understanding and practice of the technical solutions of the invention, and are not intended to limit the scope of the invention. Any equivalent change made in accordance with the structure, shape and principle of the invention shall be covered by the scope of protection claimed by the invention.

LISTING OF REFERENCE SIGNS 10 piston assembly
11 drive rod
11A first end
11B second end
12 piston plate
12A groove
12B shape-maintaining leg
13 lower limit plate structure
14 upper limit plate structure
15 extension sleeve
20 cylinder body
21 cylinder base
21A external thread
21B concave tooth hole
21C annular air drain
21D radial vent groove
21E clamping pin slot
21F urging strip
22 cylinder cover
22A internal thread
22B central hole
22C elastic component mounting position
22D positioning notch
22E upper chamber pressure port
22F lower chamber pressure port 23 externally threaded sleeve
24 clamping pin member
24A inner end notch
24B outer end stop block
30 elastic body
31 compression spring body
32 stroke restricting body
33 elastic pin
40 valve body
41 valve base
41A first flow passage
41B second flow passage
41C weir structure
41D combination hole
42 valve cover
42A longitudinal guide groove
42B convex tooth
50 diaphragm piece
51 central connecting portion
52 peripheral site
53 soft diaphragm flexion
54 through hole
60 diaphragm press block
61 peripheral tooth
62 shape-maintaining hole
70 shaft coupler
71 axial limit groove
72 lateral notch
73 limiting recess
80 combination disk
81 axial vent hole
82 tool fixation site
91 diaphragm connector
92 combining rod
93 opening degree adjusting member
94 opening degree preset
240 cylinder base and valve cover integrated piece

What is claimed is:

1. A differential pressure driven diaphragm valve with separated drive chamber and valve actuation chamber, comprising:
a piston assembly, comprising an axially movable drive rod and a piston plate fixed on the axially movable drive rod, wherein an upper surface of the piston plate is provided with a groove for a plurality of eccentrically arranged elastic bodies to abut against;
a cylinder body defining a differential pressure driven chamber, the cylinder body comprising a cylinder base and a cylinder cover fixedly connected to each other in a threadedly snap connection manner, wherein the piston plate is subjected to an upper differential pressure and a lower differential pressure, so as to be lifted or lowered in the differential pressure driven chamber to synchronously lift or lower the axially movable drive rod; the plurality of eccentrically arranged elastic bodies are provided in the cylinder cover; the piston plate is positioned in the differential pressure driven chamber; the plurality of eccentrically arranged elastic bodies are configured to have a preset elastic stroke, so that the plurality of eccentrically arranged elastic bodies do not provide an elastic force at a beginning of screwing of the cylinder cover with the cylinder base; and a first end of the axially movable drive rod is positioned in a central hole of the cylinder cover, and a second end of the axially movable drive rod is configured to pass through the cylinder base and a valve cover;
a valve body defining a valve actuation chamber, the valve body comprising a valve base and the valve cover combined with each other, wherein the cylinder base is fixedly connected to the valve cover by indirect screw connection near a shaft center and radial convex-convex limiting at a shaft periphery of a shaft;
a diaphragm piece positioned in the valve actuation chamber and configured for blocking a first flow passage and a second flow passage in the valve base, wherein a non-rotatable connection relationship is formed between a periphery of the diaphragm piece and at least one of the valve cover or the valve base;
a diaphragm press block positioned in the valve actuation chamber, the diaphragm press block configured for pushing the diaphragm piece to achieving blocking; and
a shaft coupler configured for connecting the second end of the axially movable drive rod with a central connecting portion of the diaphragm piece so that a non-rotatable connection relationship is formed between a center of the diaphragm piece and the shaft coupler, wherein the shaft coupler is detachably positioned inside the diaphragm press block and positioned on the diaphragm piece, so that a relatively rotatable connection relationship is formed between the shaft coupler and the axially movable drive rod, and a non-rotatable connection relationship is formed between the shaft coupler and the diaphragm press block; wherein the diaphragm press block has a plurality of peripheral teeth, and the valve cover has a plurality of longitudinal guide grooves for guiding sliding of the plurality of peripheral teeth, so that a non-rotatable and relatively liftable limiting relationship is formed between the diaphragm press block and the valve cover.

2. The differential pressure driven diaphragm valve with separated drive chamber and valve actuation chamber according to claim 1, wherein the piston plate and the diaphragm press block are plastic parts; a lower surface of the piston plate is provided with a plurality of shape-maintaining legs; and an upper surface of the diaphragm press block is provided with a plurality of shape-maintaining holes facing upwards.

3. The differential pressure driven diaphragm valve with separated drive chamber and valve actuation chamber according to claim 1, wherein, in the piston assembly, the axially movable drive rod is detachably connected to the piston plate; a top and a bottom of the piston plate are each provided with a limit structure; and the axially movable drive rod is in relatively rotatable connection with the piston plate.

4. The differential pressure driven diaphragm valve with separated drive chamber and valve actuation chamber according to claim 1, further comprising a combining disc movably limited by the valve cover and threadedly connected to an externally threaded sleeve protruding from below the cylinder base so as to achieve the indirect screw connection of the cylinder base with the valve cover near the shaft center.

5. The differential pressure driven diaphragm valve with separated drive chamber and valve actuation chamber according to claim 4, wherein an upper part of the valve cover is provided with a convex tooth of a round wheel shape protruding parallel to an axial direction; and a lower part of the cylinder base is provided with a concave tooth hole corresponding to the convex tooth, so as to achieve the radial convex-convex limiting at the shaft periphery of the shaft with the cylinder base which fixedly connects the cylinder base to the valve cover.

6. The differential pressure driven diaphragm valve with separated drive chamber and valve actuation chamber according to claim 4, wherein the combining disc is defined with an axial vent hole; the cylinder base forms an annular air drain at a periphery of the externally threaded sleeve; and a bottom of the cylinder base is defined with a radial vent groove communicating to outside.

7. The differential pressure driven diaphragm valve with separated drive chamber and valve actuation chamber according to claim 6, wherein a lower surface of the combining disc forms a tool fixation portion.

8. The differential pressure driven diaphragm valve with separated drive chamber and valve actuation chamber according to claim 1, wherein the cylinder cover has a plurality of equally divided elastic component mounting positions therein; the plurality of eccentrically arranged elastic bodies are configured in a number less than or equal to a number of elastic component mounting positions of the plurality of equally divided elastic component mounting positions; and the plurality of eccentrically arranged elastic bodies are selectively secured to some or all of the plurality of equally divided elastic component mounting positions.

9. The differential pressure driven diaphragm valve with separated drive chamber and valve actuation chamber according to claim 8, wherein each of the plurality of equally divided elastic component mounting positions has a stop bevel edge tapering towards a bottom and each of the plurality of eccentrically arranged elastic bodies is a pretensioned spring.

10. The differential pressure driven diaphragm valve with separated drive chamber and valve actuation chamber according to claim 1, wherein a snap-fit head formed at the second end of the axially movable drive rod snaps into an axial limit groove of the shaft coupler via a lateral notch of the shaft coupler to connect the shaft coupler with the axially movable drive rod relatively rotatably; the differential pressure driven diaphragm valve further comprises a diaphragm connector non-rotatably limited to a limiting recess at a bottom of the axial limit groove of the shaft coupler; and the diaphragm connector is fixedly connected to the central connecting portion of the diaphragm piece so as to connect the shaft coupler with the diaphragm piece relatively and non-rotatably.

11. The differential pressure driven diaphragm valve with separated drive chamber and valve actuation chamber according to claim 1, further comprising a plurality of combining rods configured for connecting the valve cover and the valve base and passing through a plurality of through holes of the periphery of the diaphragm piece so as to combine the valve cover with the valve base and non-rotatably fix the periphery of the diaphragm piece; and a weir structure is formed in the valve base between the first flow passage and the second flow passage.

12. The differential pressure driven diaphragm valve with separated drive chamber and valve actuation chamber according to claim 1, further comprising an opening degree adjusting member disposed in the central hole of the cylinder cover for limiting a highest rising position of the axially movable drive rod.

13. The differential pressure driven diaphragm valve with separated drive chamber and valve actuation chamber according to claim 12, wherein a positioning notch is defined at an opening side edge of the cylinder cover; the cylinder base is provided with a clamping pin slot; an urging strip is formed at a bottom of the clamping pin slot; a clamping pin member is inserted into the clamping pin slot; an inner end notch of the clamping pin member is pressed against the urging strip; and an outer end stop block of the clamping pin member is clamped to the positioning notch.

14. A differential pressure driven diaphragm valve, comprising:
a piston assembly comprising an axially movable drive rod and a piston plate fixed on the axially movable drive rod, wherein an upper surface of the piston plate is provided with a groove for a plurality of eccentrically arranged elastic bodies to abut against;
a cylinder valve body combination defining a differential pressure driven chamber and a valve actuation chamber, the cylinder valve body combination comprising a cylinder cover, a cylinder base and valve cover integrated piece and a valve base, wherein the cylinder cover and the cylinder base and valve cover integrated piece are fixedly connected to each other in a threadedly snap connection manner; the piston plate is subjected to an upper and lower differential pressure to cause lifting and lowering in the differential pressure driven chamber and synchronously drives lifting and lowering of the axially movable drive rod; a plurality of eccentrically arranged elastic bodies are disposed in the cylinder cover; the piston plate is positioned in the differential pressure driven chamber; the plurality of eccentrically arranged elastic bodies have a preset elastic stroke, so that the plurality of eccentrically arranged elastic bodies do not provide an elastic force when the cylinder cover is just screwed with the cylinder base and valve cover integrated piece; and one end of the axially movable drive rod is positioned in a central hole of the cylinder cover, and a second end of the axially movable drive rod is used for passing through the cylinder base and valve cover integrated piece which is combined with the valve base;
a diaphragm piece positioned in the valve actuation chamber for blocking a first flow passage and a second flow passage in the valve base, wherein a non-rotatable connection relationship is formed between a periphery of the diaphragm piece and the cylinder base and valve cover integrated piece;
a diaphragm press block positioned in the valve actuation chamber for pushing the diaphragm piece to block; and
a shaft coupler which connects the second end of the axially movable drive rod and a central connecting portion of the diaphragm piece so that a non-rotatable connection relationship is formed between a center of the diaphragm piece and the shaft coupler, wherein the shaft coupler is detachably positioned inside the diaphragm press block and positioned on the diaphragm piece, so that a relatively rotatable connection relationship is formed between the shaft coupler and the axially movable drive rod, and a non-rotatable connection relationship is formed between the shaft coupler and the diaphragm press block; wherein the diaphragm press block has a plurality of peripheral teeth, and the cylinder base and valve cover integrated piece has a plurality of longitudinal guide grooves for guiding sliding of the plurality of peripheral teeth, so that a non-rotatable and relatively liftable limiting relationship is formed between the diaphragm press block and the cylinder base and valve cover integrated piece.

15. A differential pressure driven diaphragm valve comprising a piston assembly, a cylinder valve body assembly having a differential pressure driven chamber separated from a valve actuation chamber, a diaphragm piece positioned in the valve actuation chamber for opening and closing and blocking a flow passage, wherein a drive rod of the piston assembly is configured to drive only a central connecting portion of the diaphragm piece to move up and down axially; the central connecting portion of the diaphragm piece adopts an internal guide mechanism of the valve actuation chamber to establish a non-rotatable limiting relationship with respect to a peripheral site of the diaphragm piece so as to reduce torsional stress of a soft diaphragm flexion of the diaphragm piece from corresponding deformation during lifting and lowering of the central connecting portion of the diaphragm piece.

16. The differential pressure driven diaphragm valve according to claim 15, further comprising a shaft coupler which connects an end of the drive rod and the central connecting portion of the diaphragm piece for blocking transmission of torsional stress of the drive rod to the central connecting portion of the diaphragm piece; and the internal guide mechanism of the valve actuation chamber comprises a longitudinal guide slide mechanism of a diaphragm press block in the valve actuation chamber.

* * * * *